United States Patent [19]

Blair et al.

[11] Patent Number: 5,504,929
[45] Date of Patent: Apr. 2, 1996

[54] METHOD AND APPARATUS FOR ENCODING BYTE SEQUENCE FOR SELF-CLOCKED HIGH SPEED DATA TRANSFER FROM A PARALLEL PORT

[75] Inventors: Stuart R. Blair, San Francisco; Peter Mierau, Concord; Randall J. Spurrier, Berkeley, all of Calif.

[73] Assignee: Adobe Systems Incorporated, Emeryville, Calif.

[21] Appl. No.: 154,489

[22] Filed: Nov. 17, 1993

[51] Int. Cl.$^6$ .............................. G06F 3/00; G06F 3/12; H04L 7/00; H04L 7/02

[52] U.S. Cl. ............... 395/885; 364/239.4; 364/239.3; 364/DIG. 1; 375/359; 341/95

[58] Field of Search ............................. 395/885, 888; 341/35, 59, 60, 81, 95, 82, 102; 375/359, 360

[56] References Cited

U.S. PATENT DOCUMENTS

| | | | |
|---|---|---|---|
| 3,967,062 | 8/1980 | Weller | 375/360 |
| 4,574,362 | 3/1986 | Spindel et al. | 395/275 |
| 4,797,951 | 1/1989 | Duxbury et al. | 375/359 |
| 4,811,361 | 3/1989 | Bacou et al. | 375/25 |
| 4,855,742 | 8/1989 | Verboom | 341/102 |
| 4,864,303 | 9/1989 | Ofek | 341/95 |
| 4,929,946 | 5/1990 | O'Brien et al. | 341/87 |
| 5,299,314 | 3/1994 | Gates | 395/200 |
| 5,363,098 | 11/1994 | Antoshenkov | 341/95 |
| 5,396,598 | 3/1995 | Andersen et al. | 395/275 |
| 5,398,317 | 3/1995 | Nugent | 395/200 |

OTHER PUBLICATIONS

Vransesic et al. "Microcomputer Structures", Univ. of Toronto, Saunders College Publishing, 1989 pp. 376–379, 620–622.

*Primary Examiner*—Thomas C. Lee
*Assistant Examiner*—D. Dinh
*Attorney, Agent, or Firm*—Hecker & Harriman

[57] ABSTRACT

The present invention removes restrictions on the maximum data transfer rate provided by the Centronics® and PC-compatible parallel interface (i.e., standard parallel interface). Further, the present invention retains complete compatibility with the standard parallel port and peripheral device cable. With the present invention, a computer (i.e., host) is able to send data through a standard parallel port at a high rate by eliminating the Busy handshaking signal. Further, one to three Input/Output (I/O) instructions can be eliminated for each byte of data transfer.

9 Claims, 18 Drawing Sheets

METHOD AND APPARATUS FOR ENCODING BYTE SEQUENCE FOR SELF-CLOCKED HIGH SPEED DATA TRANSFER FROM A PARALLEL PORT

BACKGROUND OF THE INVENTION

1. Field of the Invention

This invention relates to the field of data transfer between a computer system and a peripheral device.

2. Background Art

The Centronics® uni-directional 8-bit parallel host-to-peripheral device connection was developed in the mid-1960's for use with a series of small serial impact printers. (Centronics is a registered trademark of Genicom Corporation.) FIG. 1A illustrates a Centronics interface.

A parallel interface can be used to provide a communications link between a host and a peripheral device with a parallel interface (e.g., printer with a parallel interface). Data1 through Data8 transmit a character code to a peripheral device (e.g., printer). The host (i.e., computer system) generates two control signals. The strobe signal is used to transfer incoming data from the data lines into the peripheral device electronic circuitry. The input prime (i.e., init signal), when low, causes the input buffer to be cleared, the peripheral device's logic to be reset. In the case of a printer, the print head is further caused to be returned to the left margin.

There are five core signals (or status lines) that can be generated by a peripheral device. They are: Acknowledge (Ack), Busy, Paper Empty (PError), Select, and Fault. Ack is a negative going pulse that is used to verify the completed transfer of incoming data or to signal the completion of a functional operation (e.g., carriage return or form feed). An acknowledgment pulse must be received before a new code can be sent to the peripheral. Busy is a high going signal that provides a positive DC level indication during any interval when the printer cannot receive data, when a PError or a Fault exists, or an Init is present. PError indicates a paper empty condition. Select indicates that the printer is selected and available for data transfer. Fault indicates that a fault condition exists in the peripheral.

The first personal computers provided a parallel interface on the monochrome display adapter card that was compatible with the Centronics printer interface. The Personal Computer (PC) compatible Parallel Interface, added two additional control lines and modified the data transfer timing. FIG. 2A illustrates the PC-compatible parallel interface.

The two additional control lines are auto feed and select-in signals. The auto feed signal, when low, causes the paper to be automatically fed one line upon receipt and execution of a carriage return control code. The select-in, when low, enables data input into the peripheral device.

Both the Centronics and the PC-compatible parallel interface use the Data (i.e., Data1-Data8), Strobe, Busy, and Ack signals to coordinate data transfer. However, the PC-compatible can vary the sequence slightly. FIG. 1B provides a timing diagram for a data transfer using the Centronics interface. Data is loaded onto Data1-Data8 data lines. Once the data signals are settled, a Strobe signal changes from high to low to signal that incoming data was ready to be transferred from the data lines to the peripheral's electronic circuitry.

While the peripheral is taking the data from data lines, it communicates that it is unable to receive data with a high Busy signal. The Busy signal returns to a low state after receipt of the data, and a negative going Ack signal indicates completion of a data transfer.

The PC-compatible interface differs from the Centronics interface with respect to the Ack signal. FIG. 2B provides a timing diagram for a data transfer using the PC-compatible interface. The timing of the Data, Strobe, and Busy signals is the same as in the Centronics interface. However, unlike the Centronics interface, the Ack signal is generated, by some peripherals, within the Busy active period, or by other peripherals after the busy period.

A typical data transfer, using either the Centronics or PC-compatible parallel interfaces (i.e. standard parallel interface), requires the assertion of the data, control, and status signals for specific intervals. Each time a byte of data is sent to the peripheral, these signals are used to perform a process of handshaking. The host must set the data lines with the data's character code, and use the Strobe signal to indicate that the data lines contain new data. Upon recognition of the Strobe signal, the peripheral communicates a busy state using the Busy signal, and proceeds to transfer the data from the data lines. Once the peripheral completes this task, it resets Busy to indicate that it is no longer busy, and uses the Ack signal to indicate that it has successfully completed the data transfer.

The assertion of these handshaking signals reduces the theoretical data transfer rates available using the standard parallel interface. For example, the peripheral must assert Busy for 10 microseconds. Further, a Strobe pulse width is between 1 and 500 microseconds. Therefore, the theoretical data transfer rate is reduced by the practical need for a handshaking technique between the host and the peripheral. Thus, the use of all of these handshaking signals to transfer one byte of data results in the reduction of the data transfer rate that is theoretically possible with these parallel interfaces.

Further, a standard driver that manages a host's data transfer must execute at least four Input/Output (I/O) commands to transfer one byte of data. FIG. 3 illustrates a process flow for a standard driver for a printer peripheral device. At processing block 302, the status port is read. If busy, the printer cannot receive data. Therefore, if, at decision block 304 (i.e., "printer busy?"), it is determined that the printer is busy, processing continues at block 302 to monitor the status of the printer. If, at decision block 304, it is determined that the printer is not busy, processing continues at block 306 to write a byte to the data port. At block 308, an I/O operation is executed to set Strobe low. At block 310, Strobe is reset to high. Processing ends at block 312

Thus, as illustrated using a printer driver process flow, a parallel interface driver must execute at least four I/O instructions to transfer a single byte of data. Therefore, the theoretical maximum transfer rate is limited to ¼ t bytes per second, where t is the time to complete a single I/O instruction. Because of the wait states induced for computer bus timing, these I/O instructions are very slow (i.e., approximately one-half million to one million I/O instructions per second) compared to memory or register-oriented instructions (i.e., 66 million register-to-register instructions per second). This translates to a maximum throughput of 125,000 to 250,000 bytes per second for most computers. Thus, by eliminating the need for one or more of these instructions, a higher theoretical maximum transfer rate can be achieved.

The standard parallel interface is in widespread use throughout the computer industry. This parallel interface has become the de facto industry standard. Further, most printers support this interface. The current generation of personal computers (i.e., 80×86-based computer systems) provide greater computing capabilities than provided by the original personal computers that introduced the parallel interface.

Further, the printers used by these newer generation computers provide increased speed and print quality. For example, a common laser printer can print eight pages per minute using 600 dots per inch resolution. A letter-size page on this printer contains 600×600×8.5×11, or 33.66 million dots arranged in a raster bitmap pattern. Each dot is described by a single bit of information in the computer. Thus, such a page contains about 4.2 million bytes of data. If the entire page is generated as a bitmap on the host computer and sent to the printer fast enough to drive the printer at its rated speed (i.e., 8 ppm), an average transfer rate must be at least 560 k bytes per second. However, imaging burst rates, because of idle gaps between pages, are approximately 750–900 Kb per second. Therefore, the transfer rates provided by the standard parallel interface are inadequate to accommodate these burst rates and to directly and continuously drive a printing engine for these newer printers.

To overcome the lack of speed of the standard parallel interface, laser printers typically include a printing engine and a controller card. The controller card provides the intelligence needed to generate the print image and drive the printing engine. A print request and raw data are sent to the printer in a compact representation (e.g., Hewlett Packard PCL or Adobe Postscript) that transfers more quickly across a parallel port, but requires significant processing by the printer's controller card to get a raster bitmap pattern. The controller card generates the print image and drives the laser engine.

The advantage of placing the image generation capability in the printer is that there is no need to modify existing computer systems. There have been other attempts to overcome the slow data transfer rates of the standard interface that introduce a different, faster interface. However, these methods required the installation of additional hardware in the computer, printer, or both. These other attempts have not met with much commercial success.

The disadvantage of placing the print generation in the peripheral device is that it unnecessarily inflates the cost of the device. For example, manufacturing costs for the controller card needed in a printer to generate the print image can be as much as $400.00. If the print generation is done by the computer and the print image transferred to the printer at a rate sufficient to drive the laser engine, the cost of the printer's controller card can be reduced considerably. Further, the increased capabilities of the computer can be used. This can result in an ability to provide a high quality printer at a more affordable price.

Finally, there is a new standard for an asynchronous, fully interlocked, bi-directional parallel peripheral interface proposed by the Institute of Electrical and Electronic Engineers, Inc. (IEEE). This standard (i.e., IEEE 1284) recommends new electrical interfaces, cabling, and interface hardware. Thus, while this standard addresses the need for faster data transfer, implementation of IEEE 1284, in its entirety, requires hardware other than that currently used in the existing base of computer systems.

SUMMARY OF THE INVENTION

The present invention removes restrictions on the maximum data transfer rate provided by the Centronics® and PC-compatible parallel interface (i.e., standard parallel interface). Further, the present invention retains complete compatibility with the standard parallel port and interface cable. With the present invention, a computer (i.e., host) is able to send data through a standard parallel port at a high rate by eliminating the Busy handshaking signal. Further, one to three Input/Output (I/O) instructions can be eliminated for each byte of data transfer.

The present invention provides seven strategies for implementing faster parallel port I/O. These seven strategies can be used alone or in combination. These seven strategies are: Block Ready, Semistrobe, Seven Bit Self-Clocked, Eight Bit Self-Clocked with Semistrobe, Eight Bit Self-Clocked, Asynchronous Packet, and Synchronous Packet.

It should be noted that application of the present invention is not limited to any one type of peripheral device. Any type of device capable of supporting the standard parallel interface can be used. Thus, wherever these seven modes are subsequently described relative to a printer peripheral device, it should be noted that any peripheral device that can support a standard parallel interface can be substituted in place thereof without departing from the scope of the present invention.

Block Ready mode redefines the Busy signal used in the standard parallel interface. In the present invention, a Busy signal is asserted when there are less than 1024 bytes of storage available in a peripheral's input buffer. Similarly, a low Busy signal indicates that at least 1024 bytes of storage are available. The redefinition of Busy provides the ability to reduce the number of checks for Busy. That is, it is only necessary to check for Busy at the beginning of each 1024 byte block transfer. Without this redefinition, a ready (i.e., not busy) determination must be made at the beginning of each one byte data transfer.

In Semistrobe mode, the present invention provides the ability to move data from the data lines to a peripheral's buffer on any change in Strobe (i.e., either the falling or rising edges). Debouncing is performed to eliminate noise in the Strobe signal. Semistrobe mode eliminates an I/O instruction used with the standard interface. Without Semistrobe mode, a single byte transfer requires two I/O instructions to set the Strobe signal from high to low and from low to high. Using Semistrobe, only one of these I/O operations is necessary per byte transfer. That is, one I/O instruction is used, per byte transfer, to send an opposite Strobe value to indicate the availability of new data.

The high order bit of a data word can be redefined to be a semistrobe in the Seven Bit Self Clocked mode of the present invention. Sequences of seven bytes are encoded into eight bytes. The high order bit is stripped from each of the original seven bytes. These bits are placed in the low order seven bits of an eighth byte that is inserted into the data stream ahead of the original seven bytes.

The high order bit of each of the eight bytes is set to an alternating pattern (i.e., zero in the first, third, fifth, and seventh bytes, and 1 in the second, fourth, sixth and eighth bytes). Each high order bit in the eight byte sequence can act as a semistrobe thereby eliminating the need for an I/O operation to change the Strobe signal for each byte transferred.

An arbitrary length sequence of data can be transmitted to the peripheral without alternating Strobe for each byte transferred using Eight Bit Self-Clocked with Semistrobe mode. This mode adopts two techniques to data transfer. The use of one or the other technique is dependent on whether adjacent byte values are different. One technique assumes that adjacent bytes have different values. In this case, the peripheral's port receiver circuitry can determine that value Data1-Data8 has changed and then receive the new data from Data1-Data8 into an input buffer.

A second technique can be used where adjacent bytes are the same. In this case, the host can send a sequence of n identical bytes by plating the value on Data1-Data8 and toggling Strobe up or down n-1 times. Because the first byte in the n repeating bytes has a different value than its preceding byte, the peripheral can process the first identical byte using the first technique. The remaining byte in the repeating byte string (i.e., n-1) can be transferred to the peripheral using the second technique.

By encoding data for transfer such that adjacent bytes are guaranteed to be different, it is possible to universally apply the first transfer technique described above. In this sixth mode, the Eight Bit Self-Clocked with Semistrobe mode, an encoding protocol is used to guarantee that adjacent bytes are different. Thus, it is possible to send every byte to the peripheral without the use of Strobe. An example of an encoding protocol used in Eight Bit Self-Clocked mode is an adaptation of PackBits run-length compression.

In Asynchronous Packet mode, the host generates a limited length packet (e.g. eight to sixteen bytes). The host's peripheral driver software disables interrupts to insure constant byte to byte timing, issues some synchronizing signal, and writes the data packet to the peripheral port.

Longer packets of data can be transferred in the Synchronous Packet mode than in the Asynchronous Packet mode. Using this mode, clock-recovery circuitry detects boundaries between characters on the data bus. Packets may include a two-byte header where the first byte contains a code that indicates the start of the packet frame and the second byte contains the length of the data in the packet. To allow reliable clock recovery, data within a frame can be encoded using an encoding protocol that eliminates most or all identical characters.

In both asynchronous and synchronous packet modes, the host must calibrate the byte transfer timing by sending a sequence of data bytes that form a special calibration packet which the printer uses to generate accurate byte to byte recovery timing.

DETAILED DESCRIPTION OF THE INVENTION

Figure 1A:
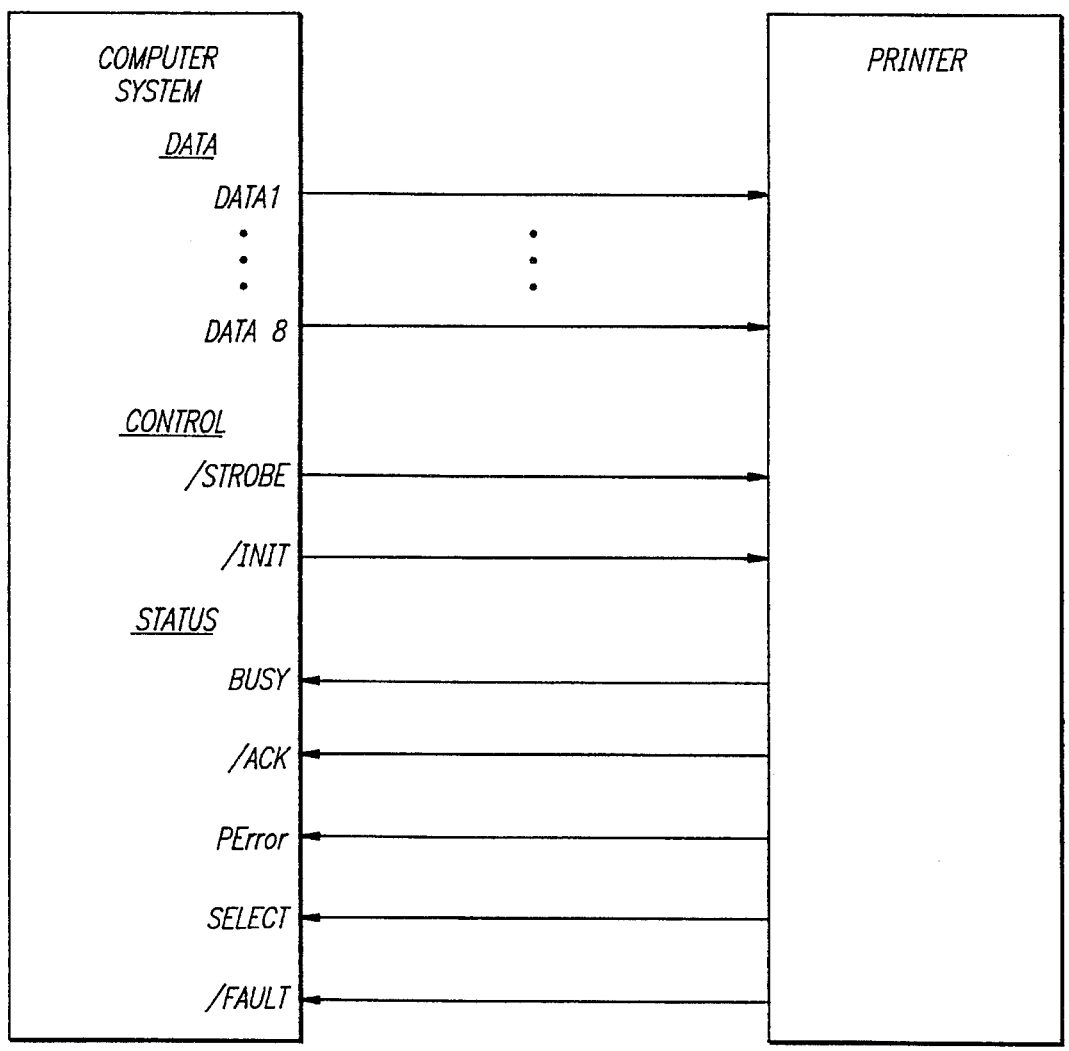
FIG. 1A–1B illustrates a Centronics® interface and timing diagram.
Figure 1B:
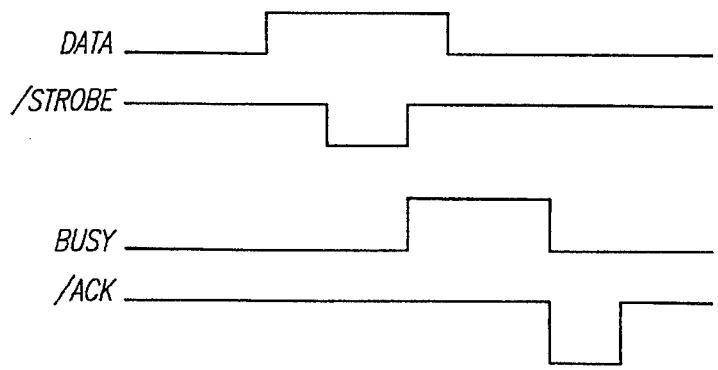
Figure 2A:
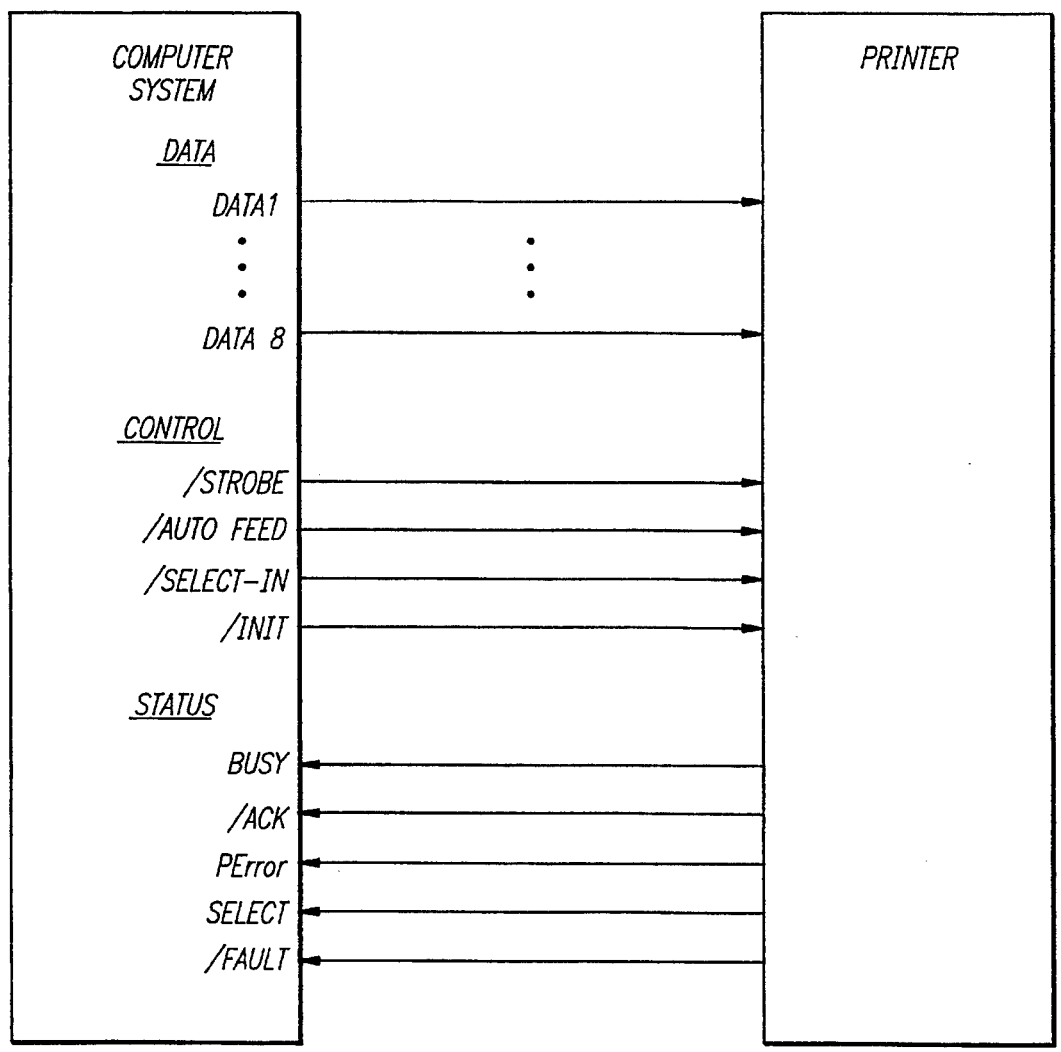
FIG. 2A–2B illustrates a PC-compatible interface and timing diagram.
Figure 2B:
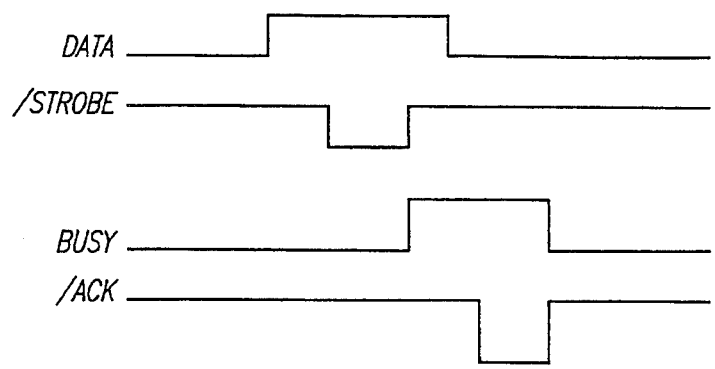
Figure 3:
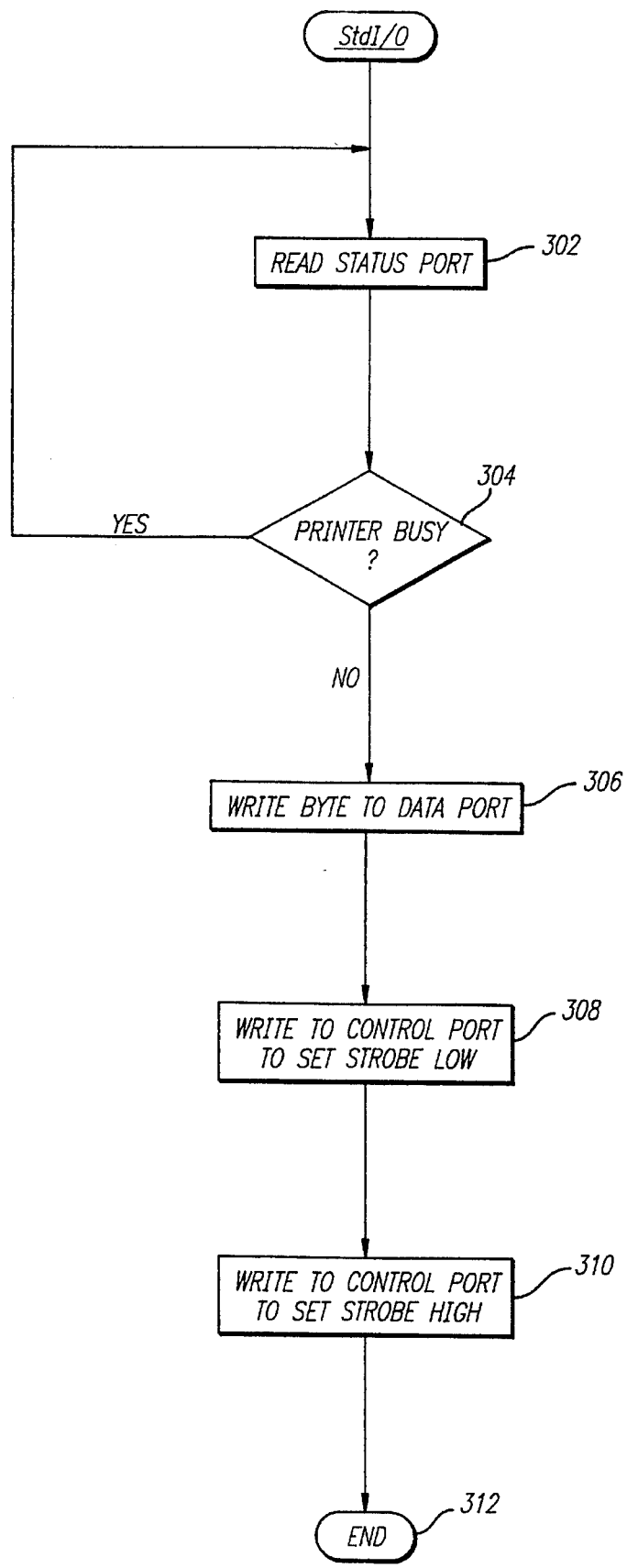
FIG. 3 illustrates a printer driver's data transfer process flow.

A method and apparatus for data transfer between a computer system and a peripheral is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

A standard printer driver that manages a host's data transfer must execute at least four Input/Output (I/O) commands to transfer one byte of data. Therefore, the theoretical maximum transfer rate for a standard interface is limited to ¼ t bytes per second, where t is the time to complete a single I/O instruction.

A typical system can execute approximately one-half to one million instructions per second. An I/O instruction is executed in approximately 1.0 to 2.0 microseconds. When a data byte transfer requires execution of four I/O instructions, a processing unit that is dedicated to a transfer task can achieve a maximum transfer rate of 125 Kilobyte (Kb) to 250 Kb per second. The present invention eliminates the need for one or more of these instructions, thereby increasing the actual transfer rate.

The present invention provides, among other things, higher speed printing of complex bit-mapped graphics pages using existing printer architectures. Further, the increased actual transfer rate achievable using the present invention provides the ability to relocate print generation from the printer to a host. Relocation of print generation to a host eliminates the need for complex printer intelligence otherwise needed to generate a print image. Therefore, relocation of print generation to a host provides the ability to manufacture high-performance, high-resolution printers at a significantly reduced cost.

The present invention removes restrictions on the maximum data transfer rate provided by the Centronics® and PC-compatible parallel interface (i.e., standard parallel interface) while retaining complete compatibility with the standard parallel port and printer cable. The present invention eliminates the Busy handshaking signal per byte of data transfer. This eliminates one Input/Output (I/O) instruction per byte of data transfer. Further, up to two of the three remaining I/O instructions can be eliminated using other modes of this invention.

The present invention provides seven strategies for implementing faster parallel port I/O. These seven strategies can be used alone or in combination. These seven strategies are: Block Ready, Semistrobe, Seven Bit Self-Clocked, Eight Bit Self-Clocked, Eight Bit Self-Clocked with Semistrobe, Asynchronous Packet, and Synchronous Packet.

BLOCK READY MODE

The standard interface uses a Busy signal (i.e., Busy signal is high) to indicate that the printer is not ready to receive data. When the printer is not busy, a host can transfer a single byte of data to the printer. However, before a host can transfer a byte of data, it must expend at least one I/O instruction per byte to check the state of the printer's Busy signal. If Busy is high when a status is done, additional I/O instructions must be expended until Busy is detected to be low.

Block Ready mode redefines the Busy signal used in the standard parallel interface. In the present invention, a Busy signal is asserted (i.e., set to high) when there are less than 1024 bytes of storage available in the printer input buffer. Similarly, a low Busy signal indicates that at least 1024 bytes of storage are available. Thus, when a printer advertises "Not Busy," it is capable of accepting a burst of data up to 1024 bytes.

Figure 4:
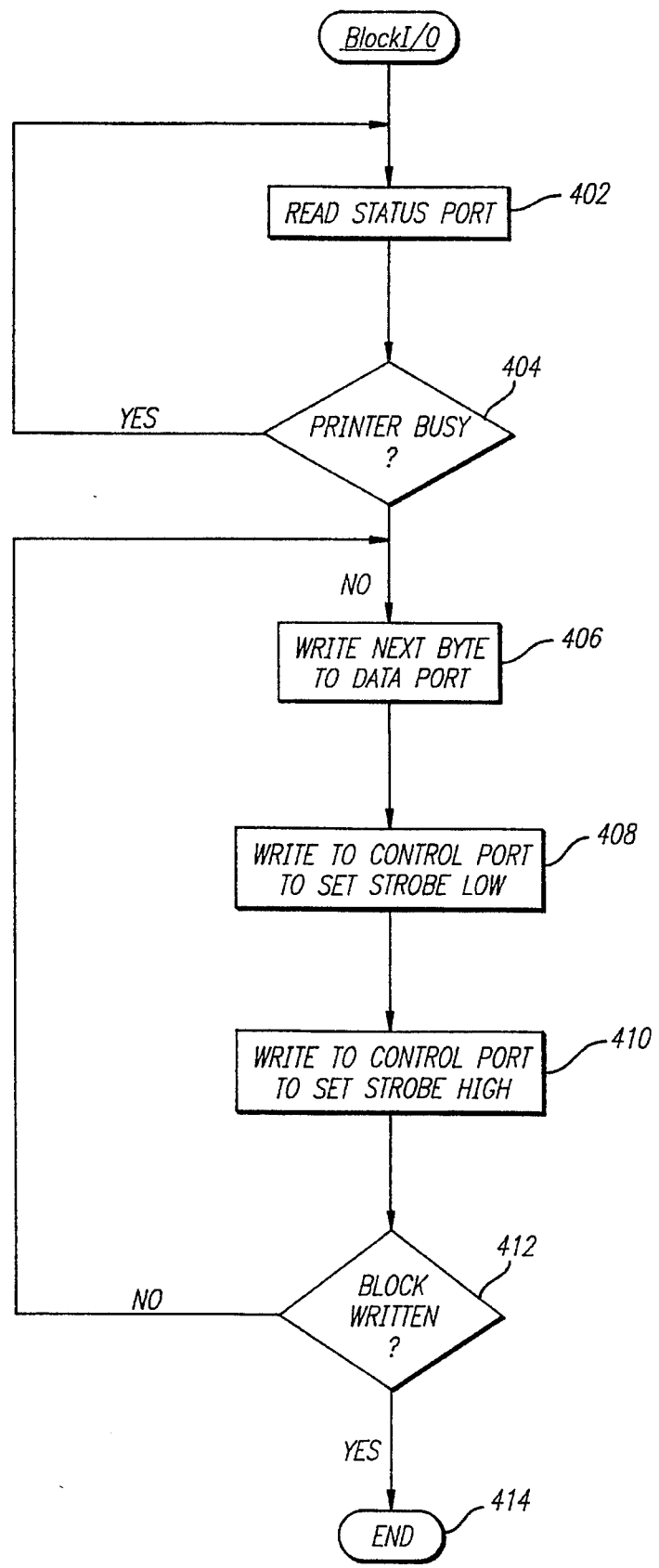
FIG. 4 illustrates a data transfer process flow using Block Ready Mode.

Further, the redefinition of Busy provides the ability to reduce the number of checks for Busy. That is, it is only necessary to check for Busy at the beginning of each 1024 byte block transfer. Without this redefinition, a ready (i.e., not busy) determination must be made for each byte in the data block. FIG. 4 illustrates a data transfer process flow using Block Ready Mode.

At processing block 402, the status port is read. At decision block 404 (i.e., "printer busy?"), if the printer is busy, processing continues at block 402. If, at decision block 404, the printer is determined to be ready to receive data, processing continues at processing block 406. At processing block 406, the next data byte is written to the data port. At processing block 408, a low Strobe signal is written to the control port. At processing block 410, a high Strobe signal is written to the control port. At derision block 412 (i.e., "block written?"), if some data remains to be transmitted to the printer, processing continues at block 406. If all of the data has been transmitted, processing ends at block 414.

After an initial status check (i.e., printer ready), it is only necessary to execute three I/O instructions (i.e., write data, write Strobe low, and write Strobe high) per data byte. However, with the block ready mode of the present invention the I/O instruction to status the printer can be executed initially before the transfer of the first data byte in a block of data. Thereafter, bytes in a data block can be transferred using only three I/O instructions. Thus, the effective transfer rate is increased from ¼ t to ⅓ t where t is the time to complete a single I/O instruction. For example, for a system that executes one million instructions per second, the transfer rate can be increased from 250 Kb per second to over 333 Kb per second.

Figure 12:
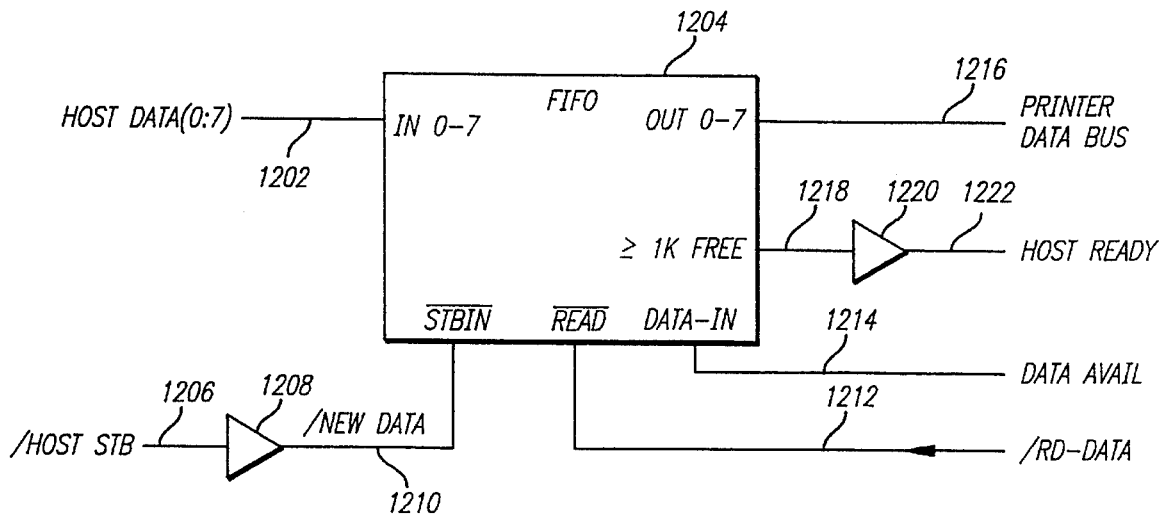
FIG. 12 provides an example of block ready receiver circuitry.

To accommodate block ready mode, a printer's receiver circuitry must read new data and indicate when at least one block of buffer space is available. FIG. 12 provides an example of such block ready receiver circuitry. HOST DATA 1202 is coupled to IN 0–7 of FIFO 1204. FIFO 1204 buffers the data received from a host. A FIFO should be large enough to accommodate one or more blocks of data (e.g., 1 Kb block(s)). While any buffer size can be used, larger buffer sizes (e.g., 32 Kb) reduce the potential that a host will receive a busy status from the printer. /HOST STB 1206 is coupled to buffer 1208. The output of buffer 1208, /NEW DATA 1210, is coupled to STBIN input of FIFO 1204. STBIN enables input from HOST DATA 1202 to IN 0–7.

DATA AVAIL 1214 is generated when unread data exists in FIFO 1204. When DATA AVAIL 1214 is high and the printer is ready to read data, /RD-DATA 1212 is generated to read data from FIFO 1204. Out 0–7 is coupled to the printer's data bus via 1216. 1K FREE 1218 is generated when FIFO is capable of receiving one or more blocks of data (e.g., 1 Kb) from a host. 1K FREE 1218 is coupled to buffer 1220. The output of buffer 1220, HOST READY 1222, indicates that at least one block of data may be transmitted by a host. If FIFO 1204 fills to within 1 Kb of full during a transfer, the printer asserts busy. However, a host that is already in the process of transferring a block of data can finish sending the data block.

Figure 18:
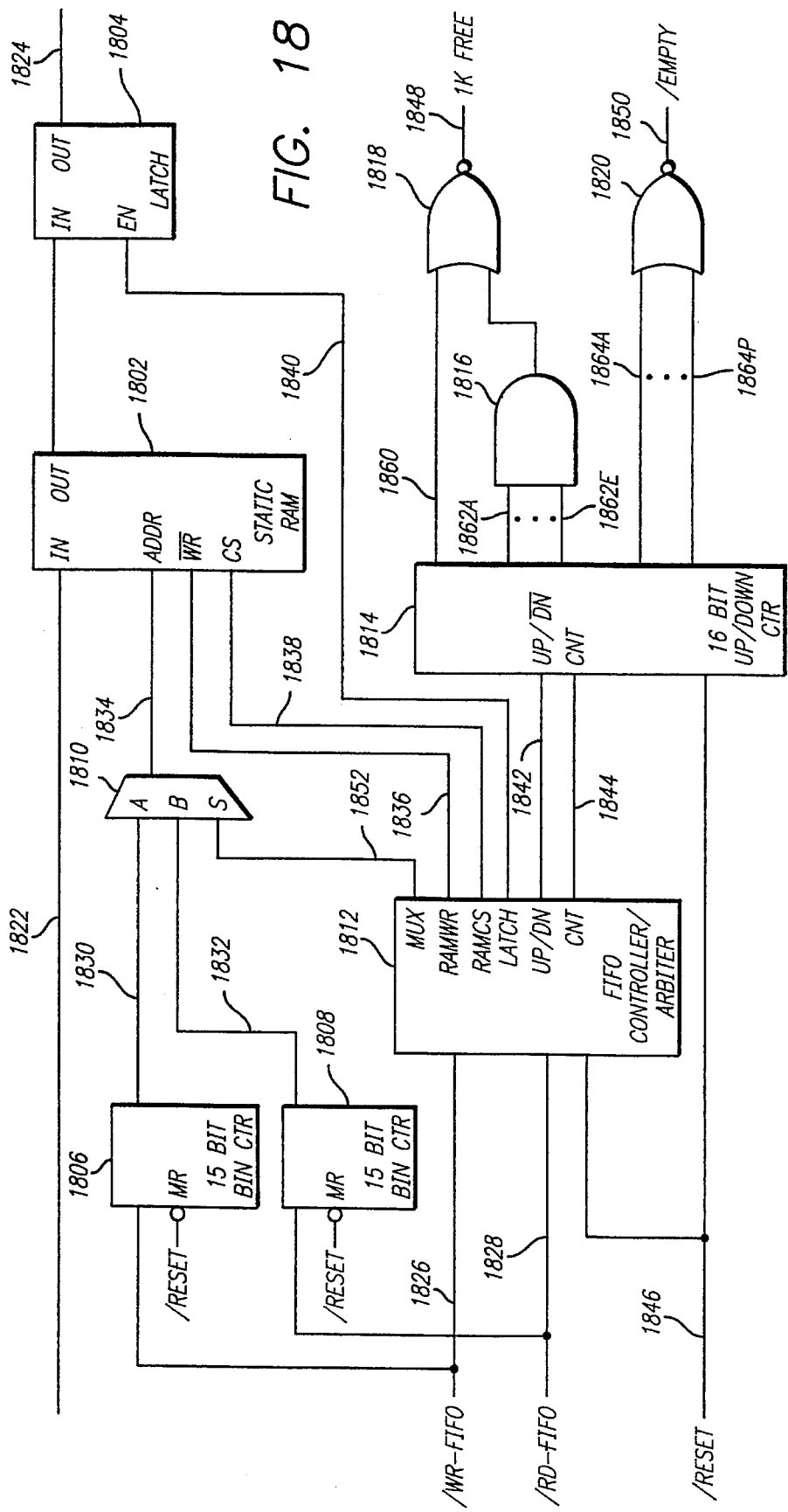
FIG. 18 illustrates "Almost Full" FIFO circuitry.

A FIFO used to generate a BLOCK READY signal to a host computer is illustrated in FIG. 18. FIFO controller/arbiter 1812 creates control and timing signals for static RAM 1802 (e.g., 32 Kb static RAM), output latch 1804, address multiplexor 1810, and up/down binary counter 1814. Up/down counter 1814 tracks the number of bytes stored in the FIFO. To address a situation where the printer reads a byte from the FIFO at the same time as the host writes a byte to the FIFO, the FIFO can internally cycle at a speed at least twice the faster of the byte input rate and the byte output rate.

The host stores input data in static RAM 1802 by placing the next data byte on the Input Data bus 1822, and pulsing/WR-FIFO 1826 low. The printer reads output data from the FIFO by driving /RD-FIFO 1828 low, and reading the output of latch 1804.

A pair of counters (e.g., 15-bit) can be used to generate the static RAM address for reading and writing data into and from static RAM 1802. Write addresses are generated by write address generator 1806. Read addresses are generated by read address generator 1808. Address generators 1806 and 1808 are coupled to multiplexor 1810. Multiplexor 1810 selects between the write and read addresses. Output 1834 of multiplexor 1810 supplies address input 1834 of static RAM 1802.

Up/down counter 1814 (e.g., 16-bit for a 32 Kb FIFO) tracks the number of bytes of data stored in the FIFO. Each time a byte is written to the FIFO, counter 1814 is incremented. Each time a byte is removed from the FIFO, counter 1814 is decremented. In the case of a 32K FIFO, when the count is at least 31 Kb and less than 32K, counter 1814 outputs, Q10–Q14, are high. When the FIFO is 32K full, Q15 of counter 1814 is high. AND gate 1816 and NOR gate 1818 negate signal 1K-FREE 1848 under either of these conditions.

Output Q15 1860 becomes input to NOR gate 1818. Output Q10–Q14 1862A–1862E become input to AND gate 1816. Output Q0–Q15 1864A–1864P become input to OR gate 1820. When FIFO is empty, the value at counter 1814 is zero. OR gate 1820 generates/EMPTY signal 1850 when outputs Q0–Q15 1864A–1864P are zero.

After each byte is successfully written, /WR-FIFO signal 1826 increments input address generator 1806. After each byte is successfully read, RD-FIFO signal 1828 increments output address generator 1808.

FIFO controller 1812 generates address multiplexor select signal 1852 based on whether an input or output cycle is being performed. FIFO controller 1812 further generates RAM signals /RAMCS 1838 and /RAMWR 1836. When a byte is read from STATIC RAM 1802, the byte is latched into output latch 1804 by latch enable signal 1840. During each cycle, FIFO controller 1812 generates control signals UP/DN 1842 and CNT 1844 to control up/down counter 1814.

SEMISTROBE MODE

Figure 5:
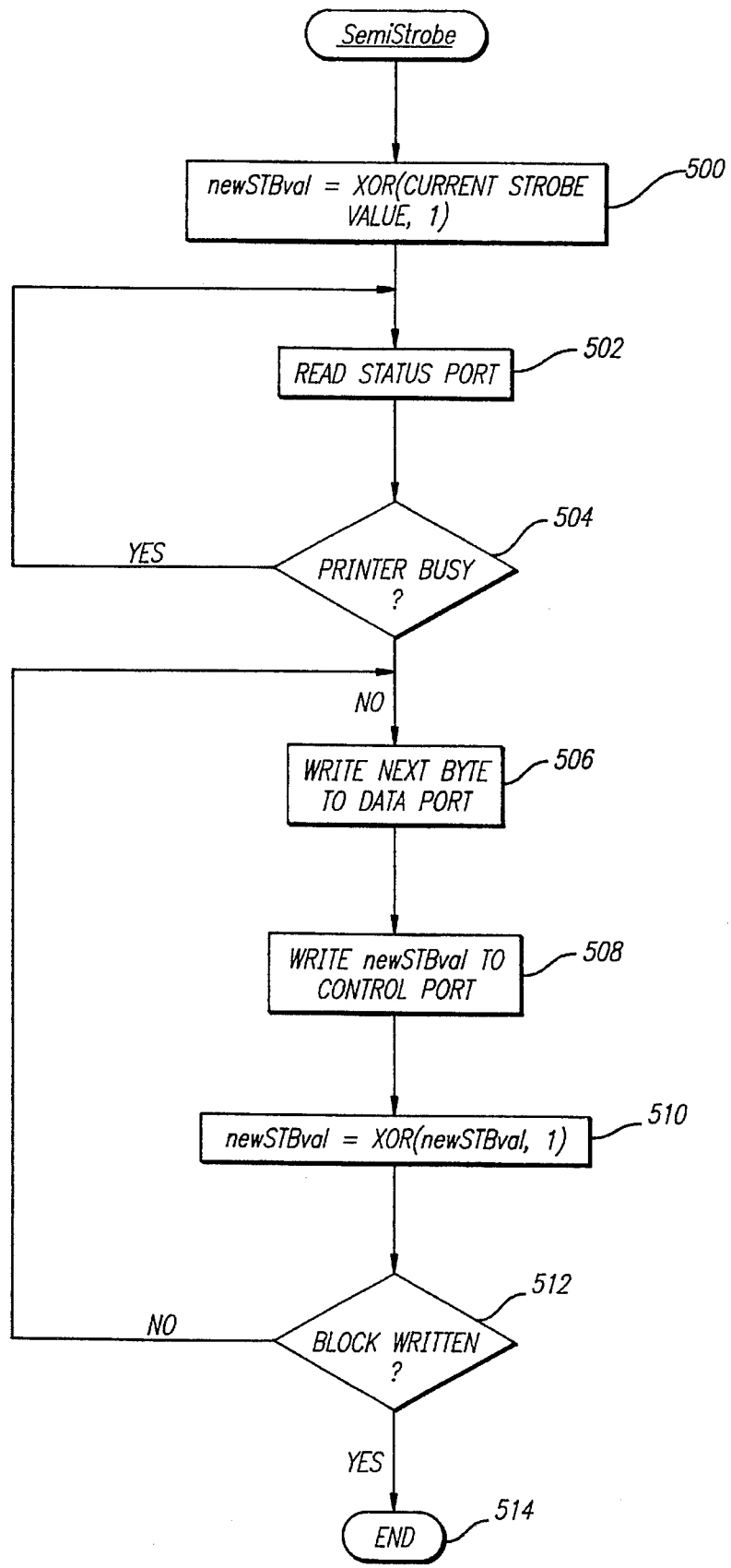
FIG. 5 illustrates a data transfer flow using Semistrobe mode.

In Semistrobe mode, the present invention provides the ability to move data from the data lines to a print buffer on any change in Strobe (i.e., either the falling or rising edges). Debouncing is performed to eliminate noise in the Strobe signal. For example, an edge detector circuit can be used to generate a low-going pulse on either the high to low or low to high transition of Strobe. The output of the edge detector can be used to clock a data byte to a printer. Semistrobe mode eliminates an I/O instruction used with the standard interface. Without Semistrobe mode, a single byte transfer requires two I/O instructions to set the Strobe signal from high to low and from low to high. Using Semistrobe, only one of these I/O operations is necessary per byte transfer. That is, one I/O instruction is used, per byte transfer, to send an opposite Strobe value to indicate the availability of new data. FIG. 5 illustrates a data transfer flow using Semistrobe mode.

At processing block 500, a new Strobe signal (i.e., newSTBval) is determined by performing an "exclusive or" operation with the current Strobe signal and a value of one. The effect of this operation is to reverse the value of the Strobe such that a low value is set to high and a high value to low. At processing block 502, the status port is read. At decision block 504 (i.e., "printer busy?"), if the printer is busy, processing continues at block 502. If, at decision block 504, the printer is determined to be ready to receive data, processing continues at processing block 506. At processing block 506, the next data byte is written to the data port. At processing block 508, an inverted Strobe signal is written to the control port. At processing block 510, an "exclusive or" operation is performed on the current newSTBval and one to reverse the value of newSTBval. At decision block 512 (i.e., "block written?"), if some data remains to be transmitted to the printer, processing continues at block 506. If all of the data has been transmitted, processing ends at block 514.

Using Semistrobe mode, one I/O instruction can be eliminated per transfer. Therefore, like block ready mode, the transfer rate can be increased to ⅓ t where t is the time to complete a single I/O instruction. In addition, many of the modes of the present invention can be used alone or in combination. Therefore, for example, Semistrobe mode can be coupled with block ready mode. In this case, the number of I/O instructions needed to transfer a data byte is reduced to two I/O instructions. Therefore, the maximum transfer rate can be doubled. Thus, the effective transfer rate is increased from ¼ t to ½ t where t is the time to complete a single I/O instruction.

For example, for a system that executes one million I/O instructions per second, the transfer rate can be increased from 250 Kb per second to approximately one megabyte per second. This transfer rate is enough to drive a print engine that can print eight pages per minute (ppm) at three hundred dots per inch (dpi) resolution or four ppm at six hundred dpi.

Figure 13:
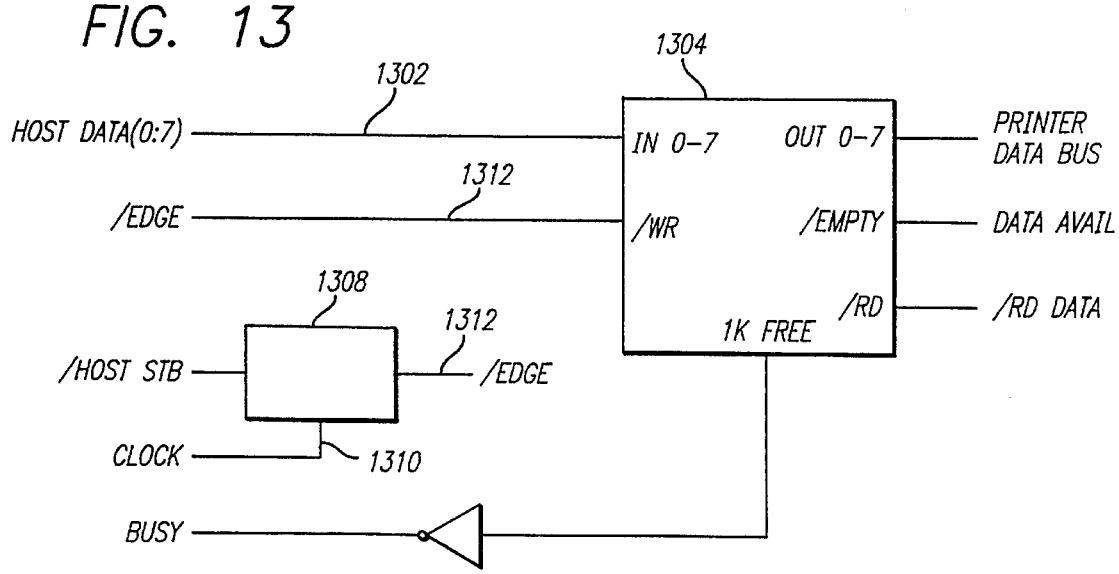
FIG. 13 provides an example of Semistrobe receiver circuitry.

A printer's receiver circuitry must read a data byte upon a change in Strobe from low to high or high to low. FIG. 13 provides an example of semistrobe receiver circuitry with a Block Ready host interface. HOST DATA 1302 is coupled to the eight bit input port (In 0–7) of a FIFO circuit. A single transmission on /HOST STB 1306 is generated by a host computer to indicate new data. /HOST STB 1306 and clock 1310 are inputs to Edge Detector 1308.

Figure 14:
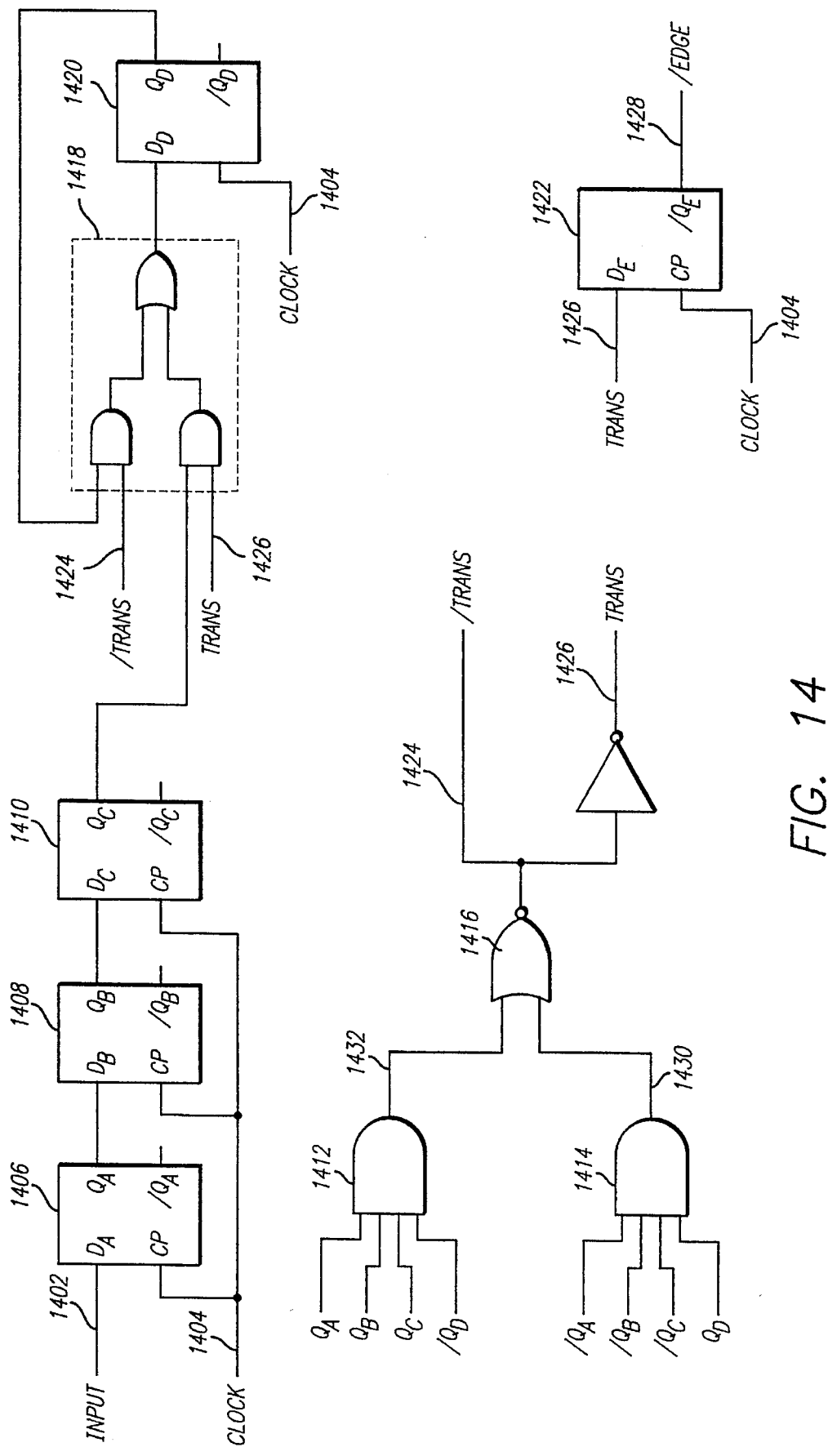
FIG. 14 provides an example of an Edge Detector.

Edge Detector 1308 debounces /HOST STB 1306 to reject noise and recognize stable transitions on /HOST STB 1306. /EDGE 1312 is generated by Edge Detector 1308. /EDGE 1312 serves as a strobe to write /HOST DATA 1302 into FIFO 1304. FIG. 14 provides an example of an edge detector.

The edge detector circuit includes a debounce circuit that rejects noise glitches and looks for a stable high or stable low Input signal 1402. Input 1402 becomes input $D_A$ of Flip-Flop 1406. A positive going dock edge of Clock 1404 (as input $CP_A$ of Flip-Flop 1406) transfers $D_A$ to output $Q_A$ and the complement of $D_A$ to /$Q_A$. $Q_A$ becomes input $D_B$ to flip-flop 1408. At the next positive-going edge of clock 1404, $D_B$ is input to flip flop 1408, and $D_B$ becomes $Q_B$. Further, the complement of $D_B$ becomes /$Q_B$. After three positive-going edges of dock signal 1404, input signal 1402 reaches $Q_C$ and /$Q_C$ of flip-flop 1410. When all $Q_A$, $Q_B$, and $Q_C$ become high after three clocks, the Input Signal is stable at a high level. Similarly, when all three of /$Q_A$, /$Q_B$, and /$Q_C$ become high after three clocks, the Input Signal is stable at a low level.

To detect an edge, or transition, on the input signal, the Edge Detector maintains a current state flip-flop, 1412. The output $Q_D$ of 1412 is the last known stable value of the Input Signal. AND gate 1412 recognizes a low-to-high transition (LOWHIGH) at the time the current state is low (/$Q_D$ high) and the input is stable at the high level (i.e., $Q_A$, $Q_B$, and $Q_C$ are high). AND gate 1412 recognizes a high-to-low transition (HIGHLOW) at the time the current state is high (i.e., $Q_D$ high) and the input is stable at the low level (/$Q_A$, /$Q_B$, and /$Q_C$ are low). NOR gate 1416 generates a low-going pulse, TRANS 1424 when a either LOWHIGH 1432 or HIGHLOW 1430 are true. Thus, /TRANS 1424 indicates the existence of a transition.

The complement of /TRANS, TRANS 1426, is used to generate /EDGE 1428. Further, /TRANS is used to latch a new stable input signal (i.e., $Q_C$) into a current state flip-flop (1420). AND-OR gate 1418 serves as a multiplexor. That is, when /TRANS is low, $Q_C$ is loaded into $D_D$ of flip-flop 1420. This establishes a new current state.

The frequency of the clock 1404 should be at least six times the rate at which the Input Signal 1402 can change to insure /EDGE 1428 is generated before the Input Signal changes twice, returning to its initial value. An increased clock frequency (e.g., approximately 16 times the maximum rate at which the Input Signal can change) may be warranted where further delay is introduced by any circuitry that uses /EDGE 1428. However, extremely high clock frequencies can make an edge detector less immune to transient noise. For example, 16 MHz frequency is sufficient for application of debouncing circuitry to printing from IBM® compatible personal computers.

SEVEN BIT SELF-CLOCKED MODE

One bit of a data word can be redefined to be a semistrobe in the Seven Bit Self Clocked mode of the present invention. Sequences of seven bytes are encoded into eight bytes. One bit (e.g., high order bit) from each of the original seven bytes is replaced with an encoding bit (i.e., either a zero or one bit). The bits replaced by the encoding bit are placed in an eighth byte (i.e., an encoding byte) that is inserted into the data stream. The eighth byte can be placed ahead of or behind the original seven data bytes. However, decoding is simplified by transferring the encoding byte before transferring the encoded data bytes.

One bit (i.e., encoding bit) in each of the seven data bytes and the encoding byte is set to an alternating pattern (i.e., zero in the first, third, fifth, and seventh bytes, and 1 in the second, fourth, sixth and eighth bytes). The encoding bit in the eight-byte sequence is used to distinguish between each byte. Thus, old and new data bytes are different and each data byte can act as its own semistrobe signal. Thus, one I/O operation (in Strobe mode) can be eliminated.

Assuming this mode is combined with the Block Ready mode, during each eight I/O operations, seven bytes of data are transferred. Thus, the effective transfer rate is increased from ¼ t to ⅞ t, where t is the time to complete a single I/O instruction. For example, in a system that can execute one million I/O instructions per second, the transfer rate can be increased from 250 Kb per second to 875 Kb per second.

By moving the eighth bit from each of the seven data bytes into a separate encoding byte, pure binary data can be transferred from the host to the peripheral. However, for 7 bit data (such as ASCII character codes), the method is simplified. In this case, there is no eighth bit, so the most significant bit of the data bytes can simply be toggled on and off from character to character. There is no need to insert an encoding byte every 7 bytes.

Figure 6A:
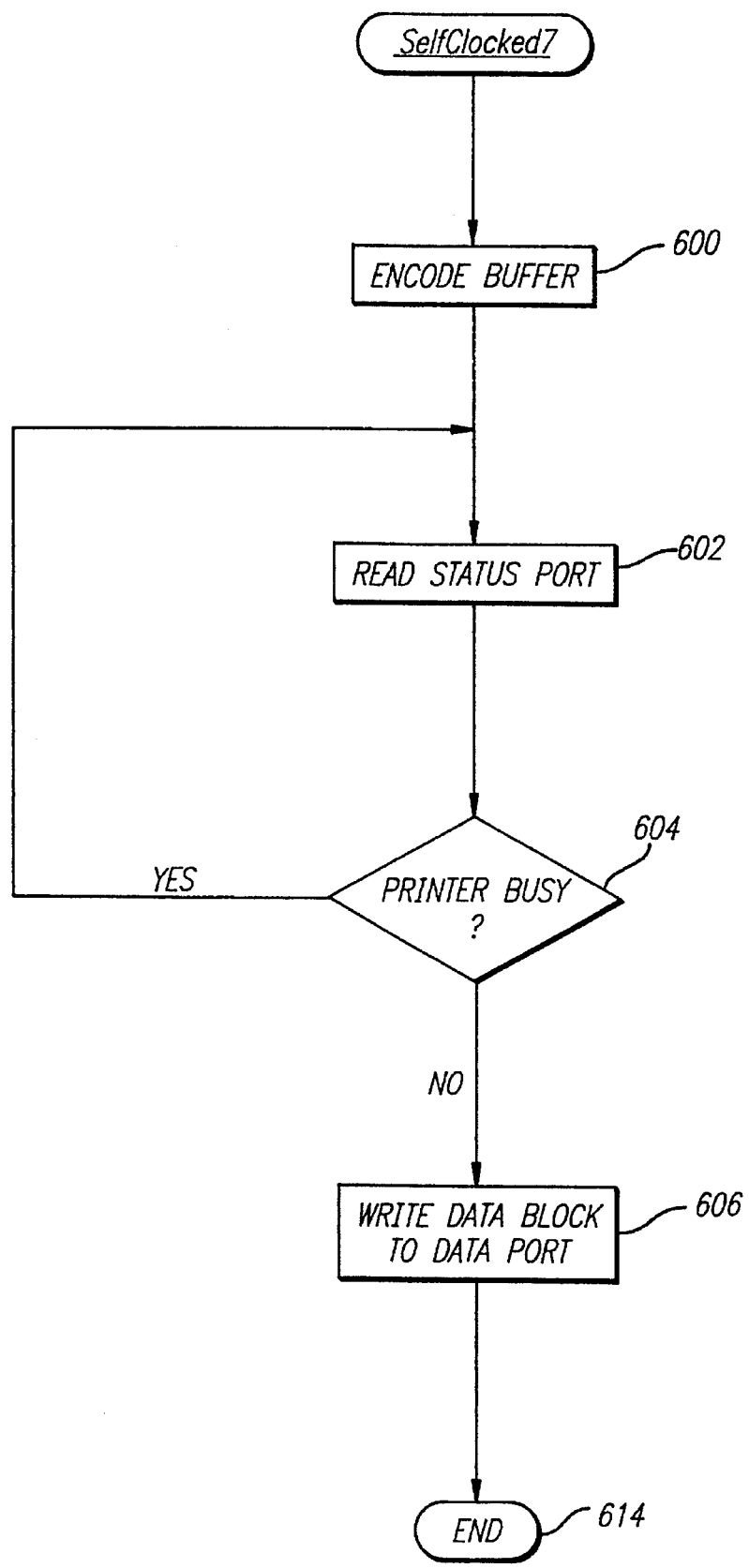
FIG. 6A illustrates a Seven-bit Self Clocked process flow.

FIG. 6A illustrates a Seven-bit Self Clocked process flow. At processing block 600, the data is encoded before it is sent to the printer. Encoded data ensures that adjacent data bytes are unique and creates an eighth byte (i.e., encoding byte). The encoding byte contains a bit from each of the next seven data bytes and a bit that differentiates this byte from any adjacent bytes. At processing block 602, the status port is read. At decision block 604 (i.e., "printer busy?"), if the printer is busy, processing continues at block 602. If, at decision block 604, the printer is determined to be ready to receive data, processing continues at processing block 606. At processing block 606, a block of data is written to the data port. Processing ends at block 614.

Encoding

Figure 6B:
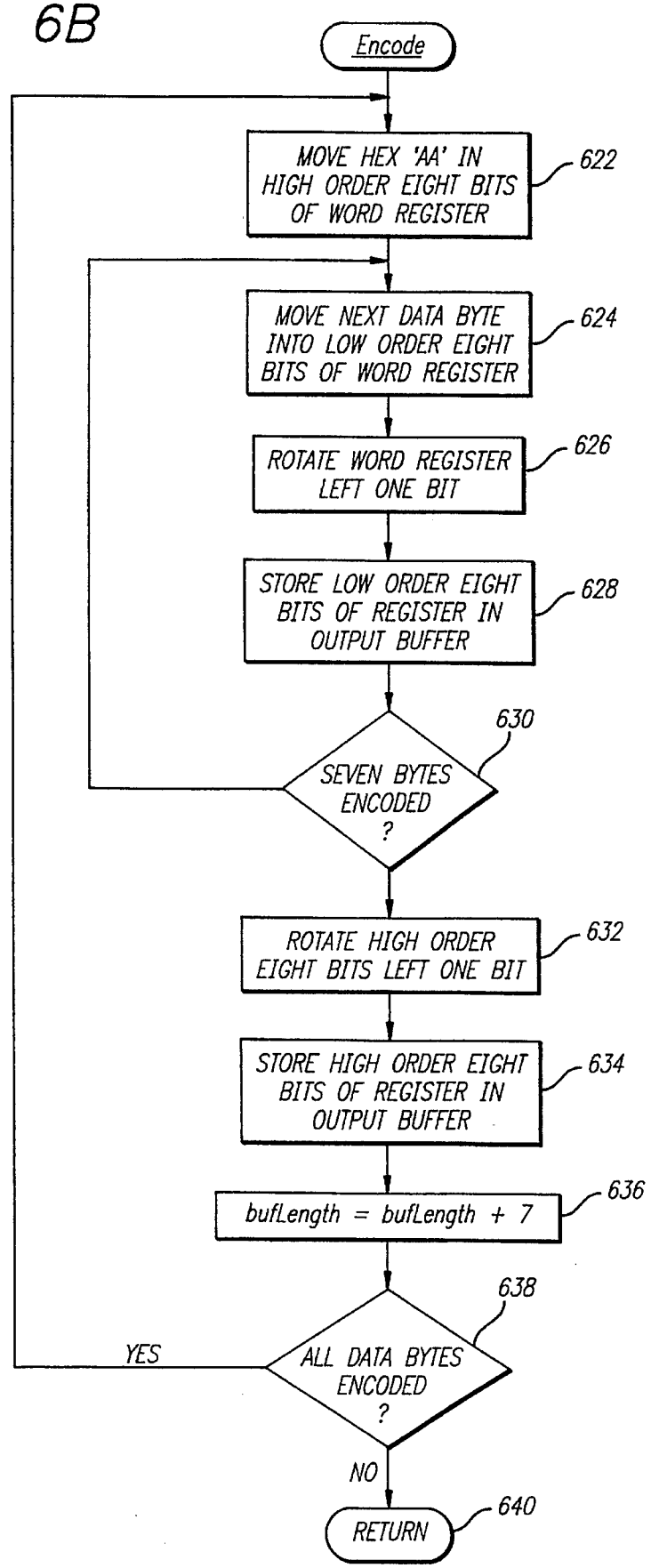
FIG. 6B illustrates an Encode process flow.

As previously indicated, because each byte is different than any adjacent bytes, there is no need to use a Strobe signal to indicate new data. Each data bit is determined or made different in the encoding process invoked at processing block 600 of FIG. 6A. FIG. 6B illustrates an Encode process flow. This Encode process illustrates a technique for storing a different bit in a sequence of seven data bytes, and retaining the eighth bit of these seven data bytes in an eighth data byte. As will become evident, any technique for generating this code can be used without departing from the scope of this patent.

Figure 8:
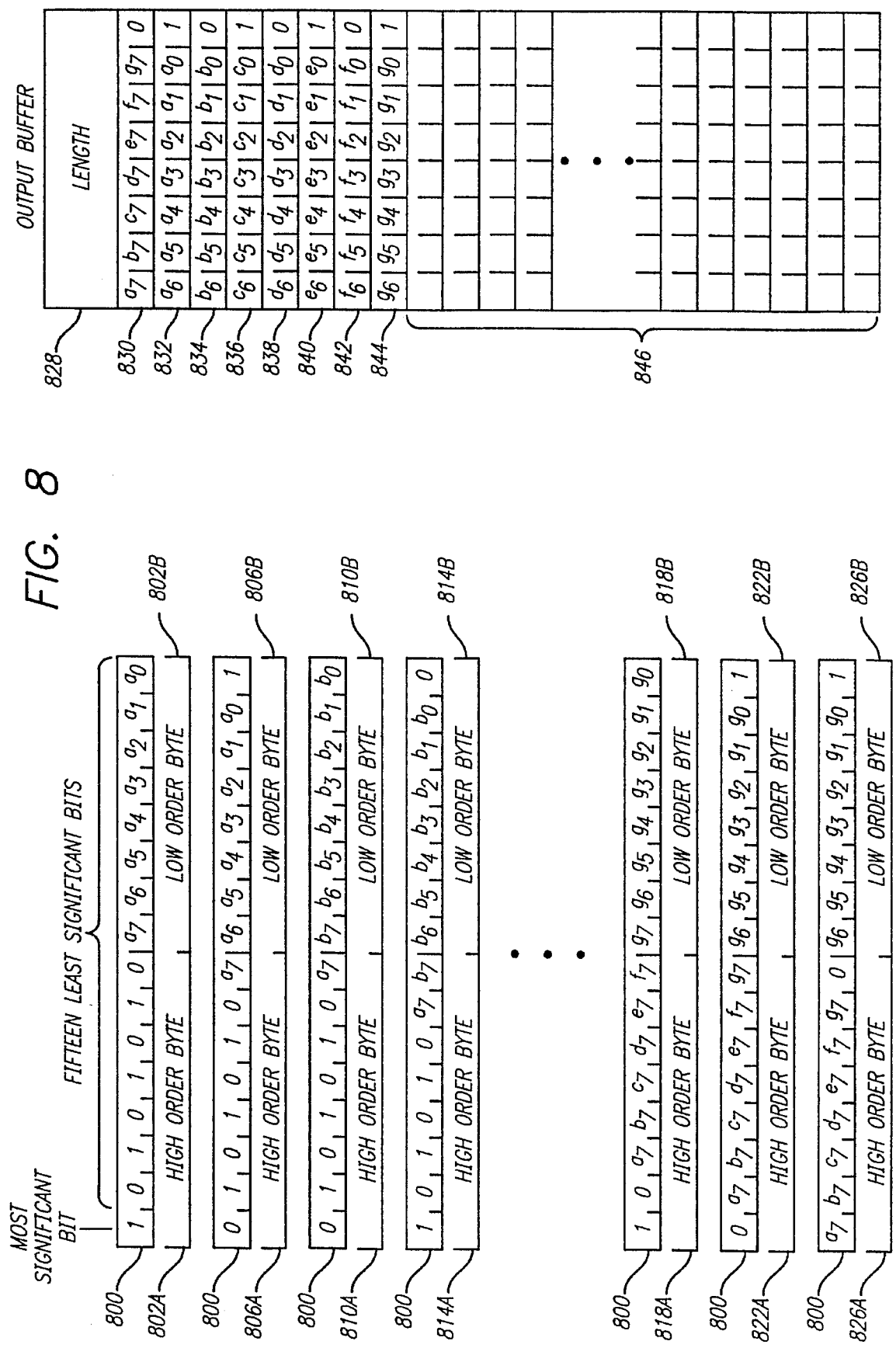
FIG. 8 illustrates register and buffer contents during an encoding operation.

At processing block 622, a hexadecimal 'AA'(i.e., binary '01010101') is loaded into the high order byte of a word register. At processing block 624, the next data byte in a seven data byte sequence is loaded into the low order byte of the word register. FIG. 8 illustrates register and buffer contents during an encoding operation. High order byte 802A and Low Order byte 802B illustrate the contents of word register 800 after the execution of processing blocks 622 and 624 of FIG. 6B.

Referring to FIG. 6B, at processing block 626, the word register is rotated left one bit. Referring to FIG. 8, a rotate left operation results in the rotation of the register's fifteen least significant bits left one bit and the placement of the most significant bit in the register's rightmost bit. Referring to FIG. 6, the register's low order byte (e.g., byte 802B in FIG. 8) is stored in the next entry in an output buffer (e.g., entry 832 in FIG. 8).

At decision block 630 ("seven bytes encoded?"), if a seven data byte sequence has not been encoded, processing continues at block 624 to process any remaining bytes in the data byte sequence. If a seven data byte sequence has been encoded, processing continues at block 632. At processing block 632, the high order byte of the register is rotated left one bit. Referring to FIG. 8, bytes 818A–818B illustrate the contents of word register 800 after six data bytes have been processed and their encoded values stored in the output buffer (i.e., buffer entries 832–842). High order byte 818A contains a bit (e.g., the most significant bit, $a_7$–$f_7$) from each of the previous six data bytes and the remaining bits in the alternating zero and one bit sequence (i.e., "10") originally loaded into the high order bit of register 800. Byte 818B contains a seventh data byte. Bytes 822A–899B illustrate the contents of register 800 after a rotate left operation is performed.

Once byte 822B is stored in the output buffer (i.e., entry 844), the eighth byte (i.e., the byte that contains a bit from each of the previous seven data bytes) must be encoded and written to the output buffer. Byte 822A illustrates the contents of the eighth byte prior to its encoding. Byte 822A is rotated left one bit to yield byte 826A. The rotate operation rotated the leftmost bit to the rightmost bit and moves the other seven bits one bit to the left. Referring to FIG. 6, the rotate operation is performed by processing block 632. At processing block 634, the encoded eighth byte is stored in the output buffer. Referring to FIG. 8, the eighth data byte is stored in entry 830 of the output buffer. At processing block 636, the length of the buffer is increased by seven to include the seven data bytes sequence just processed. At decision block 638 (i.e., "all data bytes encoded?"), if data bytes remain to be encoded, processing continues at block 622 to process remaining data bytes. If, at decision block 638, it is determined that all of the data bytes have been encoded, processing returns at block 640.

Decoding

Referring to FIG. 8, the eighth data byte is stored in entry 830 of the output buffer. While it is possible to place this byte in the output buffer after the seven bytes in this sequence, it is preferable to place it before the other bytes in the sequence. Placement of the eighth data byte before the other seven data bytes facilitates the decoding process. That is, the eighth byte can be read and retained by the printer. As each subsequent data byte is read by the printer, the printer can shift the eighth data bit (e.g., $a_7$ of buffer entry 830) in the appropriate position of its corresponding data byte to yield the original data byte (e.g., "$a_7 a_6 a_5 a_4 a_3 a_2 a_1 a_0$").

Figure 15:
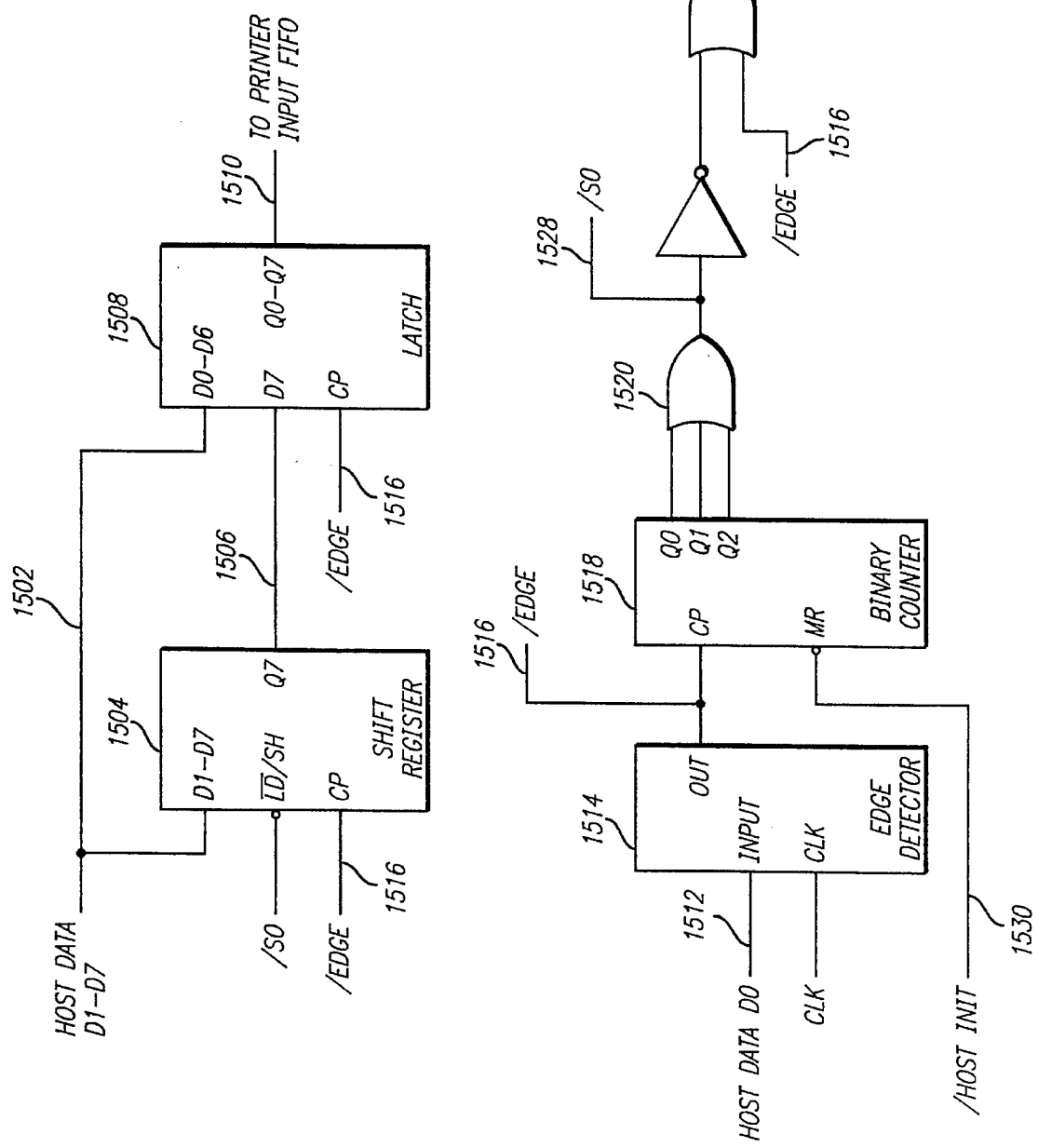
FIG. 15 illustrates input circuitry to decode byte transmissions for Seven-bit Self-Clocked.

Multiple methods exist for decoding an encoded sequence of seven data bytes. The method chosen depends on the method used to encode the seven data byte sequence. FIG. 15 illustrates input circuitry to decode bytes with low-order bit encoding.

HOST DATA DO 1512 is input to edge detector 1514. Edge detector 1514 generates /EDGE signal 1516 (e.g., a short active-low pulse that occurs on each transition of HOST DO 1512. /EDGE 1516 becomes a dock signal (i.e., CP) for shift register 1504, latch 1508, counter 1518, and new data flip-flop 1524.

Counter 1518 can be a modulo-8 binary up counter that generates a state count on outputs Q2–Q0. As each byte is received from the host, the count increments from zero to seven, corresponding to the byte sequence in the eight byte input data set. That is, when count is zero, the circuit is expecting to receive an encoding byte (e.g., byte 830 in FIG. 8). When the count is equal to one through seven, the circuit expects to receive bytes one through seven (e.g., bytes 832 through 844 in FIG. 8), respectively. After the seventh data byte of the sequence has been received, the counter becomes zero, in preparation for the next eight-byte sequence.

A zero state count is decoded into an /S0 1528 (i.e., an active-low State 0 signal), by OR gate 1520. /S0 1528 enables /EDGE to clock the encoding byte of the eight byte sequence into a parallel-load shift register. As each of the seven data bytes are received, /S0 1528 is high. When /S0 1528 is high, shift register 1504 shifts its contents (i.e., high order bits of remaining data bytes) left. A data byte's high-order bit is output on Q7 1506. /EDGE 1516 serves as a dock signal for shift register 1504 and latch 1508.

For example, /EDGE 1516 causes HOST DATA D1–D7 1502 to be loaded into bits zero through six of the latch 1508. The encoding byte is loaded but ignored by latch 1508. As these bytes are loaded into the latch 1508, a data byte's bit seven is recovered from Q7 1506 and combined with its respective data byte to generate the original, unencoded data byte on outputs Q0–Q7 1510. This byte can be sent to a printer's input FIFO.

Flip-flop 1524 creates an active-low /NEWDATA pulse 1526 for each EDGE pulse except during state zero. Thus, at state zero, the circuit is receiving an encoding byte into shift register 1504. Thus, no data byte is generated during state zero.

EIGHT BIT SELF-CLOCKED WITH SEMISTROBE MODE

An arbitrary length sequence of data can be transmitted to the printer without alternating Strobe using Eight Bit Self-Clocked mode. This mode adopts two techniques to data transfer. The use of one or the other technique is dependent on whether adjacent byte values are different. One technique assumes that adjacent bytes have different values. In this case, the printer port receiver circuitry can determine that value Data1-Data8 has changed and then receive the new data from Data1-Data8 into an input buffer.

In the case where adjacent bytes are the same, the host can send a sequence of n identical bytes by placing the value on Data1-Data8 and toggle Strobe up or down n–1 times. Because the first byte in the n repeating bytes has a different value than its preceding byte, the printer can process the first identical byte using the first technique. The remaining bytes in the repeating byte string (i.e., n–1) can be transferred to the printer using the second technique.

Figure 7A:
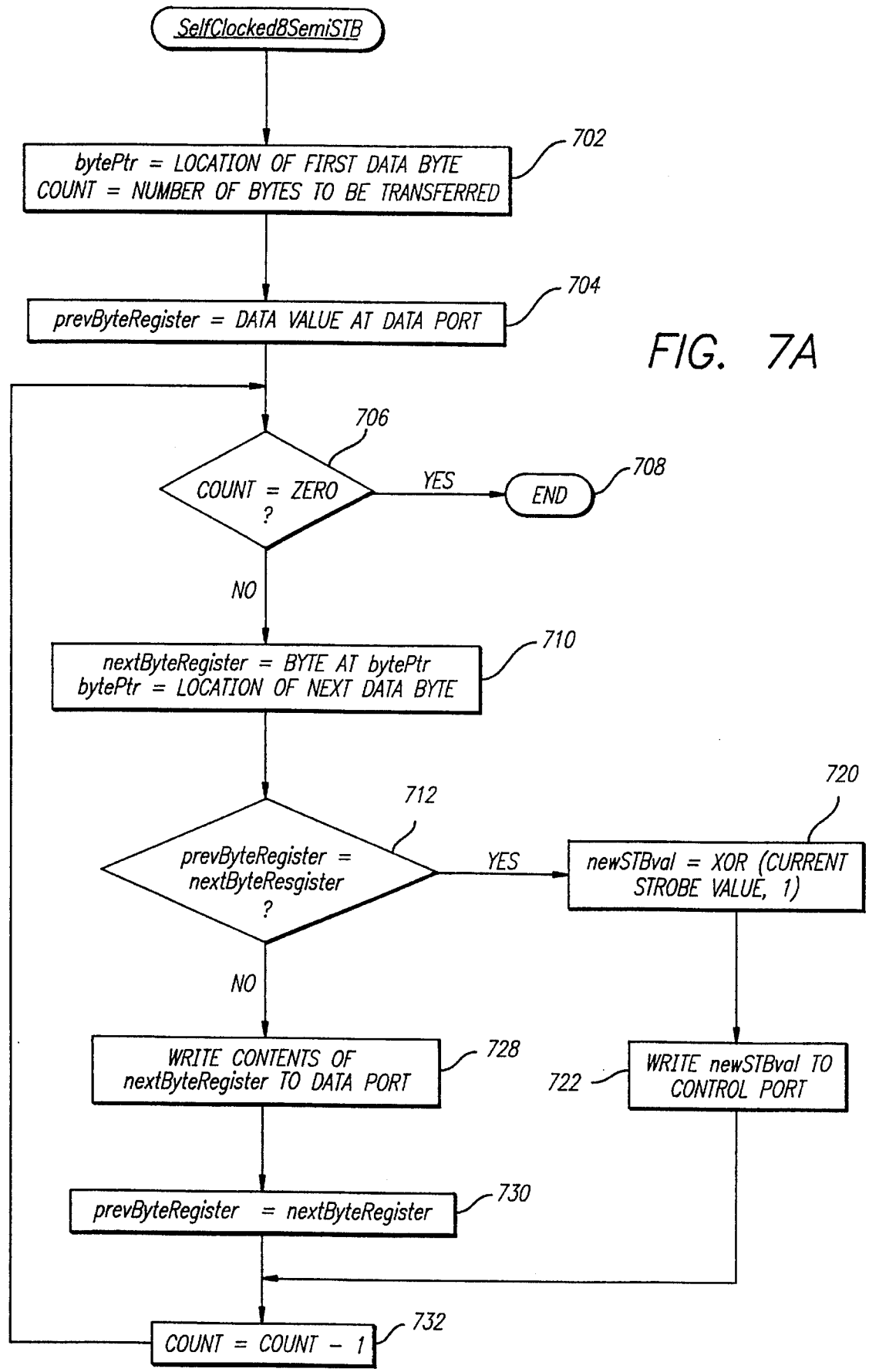
FIG. 7A illustrates an Eight bit Self Clocked with Semistrobe process flow.

FIG. 7A illustrates an Eight bit Self Clocked with Semistrobe process flow. At processing block 702, bytePtr is set to point to the first data byte to be transferred, and count is initialized to the number of bytes to be transferred. At processing block 704, the value that currently exists on the data lines (i.e., the data value most recently written to the data port) is stored in prevByteRegister. At decision block 706 (i.e., "count=zero?"), if all of the data bytes have been processed, processing ends at block 708.

If, at decision block 706, data bytes remain to be processed, processing continues at block 710. At block 710, the data at bytePtr is stored in nextByteRegister. At decision block 712 (i.e., "prevByteRegister=nextByteRegister?"), if two adjacent data bytes are equal, the contents of nextByteRegister have already been written to the data port. Therefore, it is only necessary to toggle Strobe. Thus, at processing block 720, a new Strobe signal (i.e., newSTBval) is determined by performing an "exclusive or" operation with the current Strobe signal and a value of one. The effect of this operation is to reverse the value of the Strobe (i.e., a low value is set to high and a high value is set to low). At processing block 722, newSTBval is written to the control port. Processing continues at processing block 732.

If, at decision block 712 (i.e., prevByteRegister=nextByteRegister?"), a new data value is detected, processing continues at processing block 728 to write the new data (i.e., contents of nextByteRegister) to the data port. At processing block 730, the contents of nextByteRegister are loaded into prevByteRegister. Processing continues at block 732.

At processing block 732 count is decremented by one. Processing continues at decision block 706 (i.e., "count=zero?"), to process any remaining data bytes.

Figure 7B:
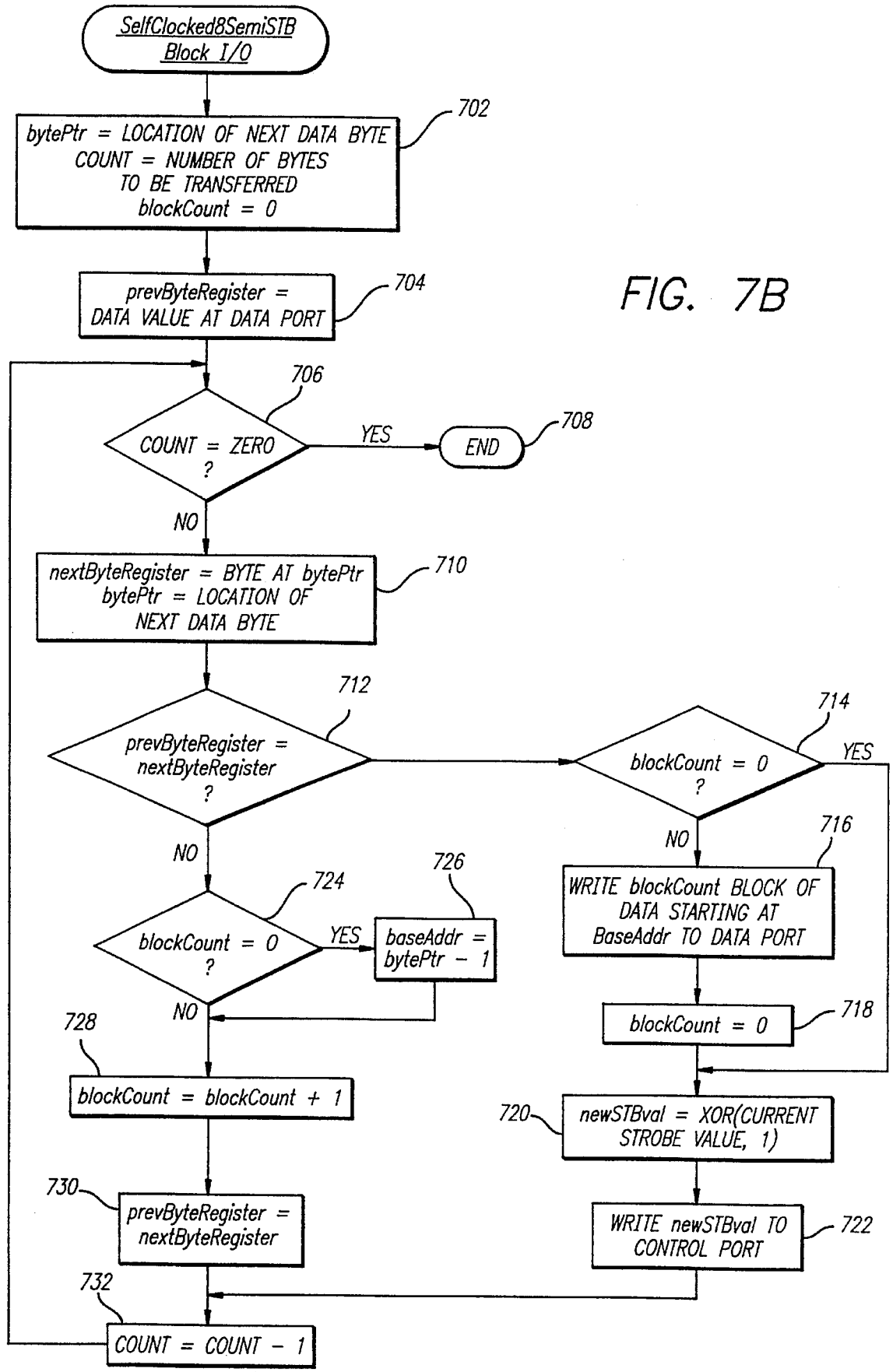
FIG. 7B illustrates an Eight bit Self Clocked with Semistrobe process flow using block Input/Output.

Modifications can be made to the process flow in FIG. 7A to accommodate specific features provided by different microprocessors. For example, some microprocessors (e.g., the Intel® 386, 486, etc.) provide block I/O instructions that allow a block of data to be transferred with a single I/O instruction. The "REP" instruction provides the ability to repeat an "output string to port" instruction (e.g., OUTS and OUTSB) a specified number of times. In this case, it is possible to transfer a block of non repeating data bytes (i.e., each byte in the block is different than its adjacent data bytes) using these block I/O instructions. Because each data byte differs, there is no need to generate a Strobe signal. Some additional transfer speed may be attained using block I/O instructions. FIG. 7B illustrates an Eight bit Self Clocked with Semistrobe process flow using block Input/Output.

Processing block 702 of FIG. 7B is identical to the correspondingly numbered block (i.e., block 702) in FIG. 7A with one exception. A blockCount has been added and is initialized to zero in processing block 702 of FIG. 7B. The other similarly numbered blocks in FIG. 7B have the same functionality has their counterparts in FIG. 7A unless otherwise stated below.

Instead of writing new data (i.e., contents of nextByteRegister) to the data port individually, a block of new data is established and output using a block I/O instruction. Thus, at decision block 712 of FIG. 7B (i.e., prevByteRegister= nextByteRegister?"), if a new data value is detected, processing continues at decision block 724 to form a block of data. At decision block 724 (i.e., blockCount=0?), if no block currently exists, processing continues at block 726 to establish a base address for the block of data, and processing continues at block 728. If a block already exists, processing continues at block 728.

At processing block 728, the blockCount is incremented by one. At processing block 730, the contents of nextByteRegister are loaded into prevByteRegister. Processing continues at block 732.

If, at decision block 712 (i.e., "prevByteRegister=nextByteRegister?"), two adjacent data bytes are equal, processing continues at decision block 714. At decision block 714 (i.e., blockCount=0?), if a block of non-repeating data does not exist (blockCount=0), processing continues at processing block 720. If a block of non-repeating data exists, the block is written to the data port using a block I/O instruction at processing block 716. At processing block 718, blockCount is initialized to zero. Processing continues at processing block 720 to process the repeating data byte (i.e., nextByteRegister).

As in FIG. 7A, it is only necessary to toggle semi-Strobe for a repeating data byte. Thus, at processing block 720 in FIG. 7B, a new Strobe signal (i.e., newSTBval) is determined by performing an "exclusive or" operation with the current Strobe signal and a value of one. The effect of this operation is to reverse the value of the Strobe (i.e., a low value is set to high and a high value is set to low). At processing block 722, newSTBval is written to the control port. Processing continues at processing block 732.

At processing block 732 count is decremented by one. Processing continues at decision block 706 to process any remaining data bytes. If the count has reached zero, then a check is made to determine if there is one remaining block of nonrepeating data (i.e. block count>zero). If so, then write blockCount bytes of data starting at baseAdder to the data port. If not, or after writing, end.

As illustrated in the FIGS. 7A–7B, non-repeating blocks of data can be transferred using a block I/O instruction (e.g., rep outsb). Further, for datastreams that do not contain like, adjacent data bytes, the number of I/O instructions needed to transfer a data byte using this mode is reduced to one I/O instruction. If the data bytes are compressed prior to transfer, the probability of encountering like, adjacent data bytes is reduced. Therefore, the effective transfer rate is increased from ¼ t to 1/t where t is the time to complete a single I/O instruction. For example, for a system that executes one million I/O instructions per second, the transfer rate can be increased from 250 Kb per second to approximately one megabyte per second.

For repeating data bytes, it is only necessary to send new Strobe signal to indicate that a new data byte is available. That is, when a host sends a sequence of n (i.e., two or more) identical bytes, it places the byte value on the data lines (from which the printer buffers the first instance of the byte), and then toggles Strobe high and low n–1 times. Each time a new Strobe signal is received, the printer records an additional copy of the byte on the data line in its input buffer. Therefore, once the repeating byte is written, each repetition of the byte requires only one I/O instruction to send a new Strobe signal. For example, for a system that executes one million I/O instructions per second, the transfer rate can be increased from 250 Kb per second to approximately one megabyte per second.

Receiver Circuitry

The receiver circuitry in the printer needs to recognize two events as indicating the arrival of a new data byte. Under the first technique, (i.e. where adjacent bytes are different), the printer port recognizes a transition of the 8 data lines, from one stable value to a new stable value, and then receives that new value into an input buffer.

Under the second technique, (i.e. where adjacent bytes are the same) the printer port recognizes a semi strobe transition on the strobe line and then receives the new data byte into the input buffer.

Figure 17:
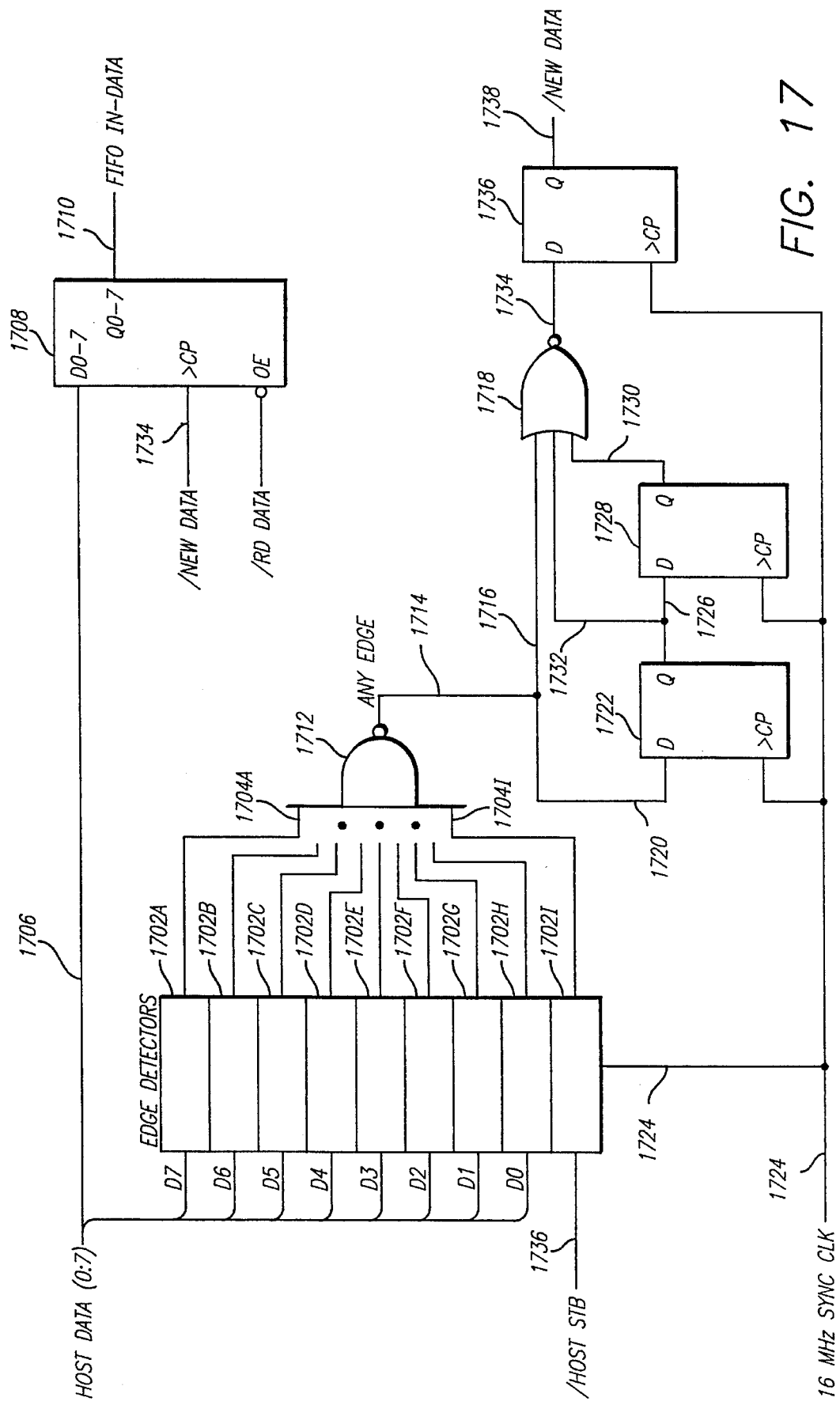
FIG. 17 illustrates Eight-bit Self-Clocked with Semistrobe mode printer receiver circuitry where adjacent bytes can be equal.

FIG. 17 illustrates a circuit which implements printer receiver for these two techniques. Whenever a byte is transmitted that differs from the previous byte, at least one of the post data lines 1706 will change. Edge detector 1702A–1702H recognizes changes on each input data line D7 to D0. The outputs of the edge detectors 1704A–1704H pulse low when a change is recognized. These outputs are combined by Nand gate 1712 and generate an active high pulse ANYEDGE 1716. The ANYEDGE signal 1716 propagates through two-bit shift register 1722 and 1728 such that the /NEWDATA signal 1738 is generated by flip-flop 1736 for three clock 1724 periods.

If two bits are changed, the edge detectors on those two bits may fire at different dock edges, and so as soon as the first one docks in, another edge detection isn't recognized for three clocks. The new data signal is provided to a 2 bit shift register, and generate a /NEWDATA signal. If ANYEDGE comes in 1 or 2 clocks later, because of the transmission line delays, one byte is still recognized.

Whenever a byte is received that is identical to the previous byte, then the semi strobe edges transmitted by the host on /Host Strobe 1736, edge detector 1702I recognizes the semi-strobe which then generates the Any-Edge signal 1716 through Nand-gate 1712. Any change in the 9 bit word results in the data signal, causing the data byte to stored in the printer buffer.

EIGHT BIT SELF-CLOCKED MODE

By encoding data for transfer such that adjacent bytes are guaranteed to be different, it is possible to universally apply the first transfer technique described in the Eight Bit Self-Clocked with Semistrobe mode. That is, a block data transfer can be performed without the need to generate any Strobe signal. Thus, the Eight Bit Self-Clock mode transfers data without Strobe.

Figure 16:
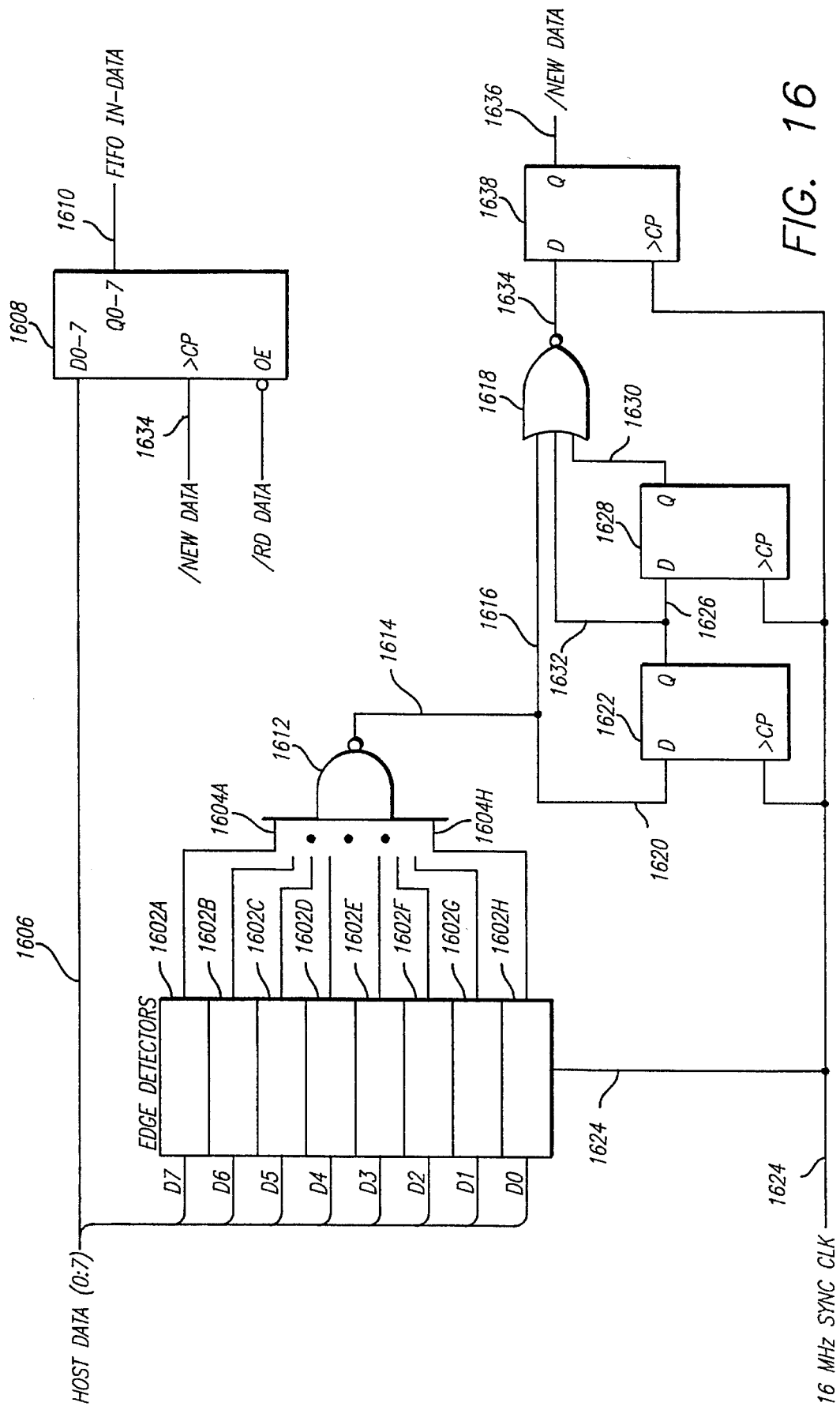
FIG. 16 illustrates Eight-bit Self-Clocked mode printer receiver circuitry where adjacent bytes are different.

FIG. 16 illustrates printer receiver circuitry where adjacent bytes are different. The printer port receiver circuitry can determine that value Data1-Data8 has changed and then receive the new data from Data1-Data8 into an input buffer. HOST DATA (0:7) is input D0–7 to flip-flop 1608. On the edge of a low /NEW DATA and a low /RD DATA, input D0–7 becomes output Q0–7 and is transmitted via 1610 to the printer's buffer. Eight bits of HOST DATA (0:7) (i.e., D7–D0) become an input of edge detectors 1602A–1602H, respectively. Clock signal 1624 is provided to edge detectors 1602A–1602H.

Edge detector output signals 1604A–1604H become the input of hand gate 1612. Output of nand gate 1612 becomes input 1616 to NAND gate 1618 and input 1620 to flip-flop 1622. The output of flip-flop 1622 becomes input 1626 to flip-flop 1628 and input 1632 to nor gate 1618. Input 1626 becomes output 1630 on the next cycle of clock signal 1624. Output 1630 becomes input to NOR gate 1618. Output 1634 becomes input to flip-flop 1638. Output 1636 of flip-flop 1638 is /NEW DATA. /NEW DATA is, therefore, low when an edge is detected and either one or both of outputs 1632 and 1630 are high.

In the Eight Bit Self-Clocked mode, an encoding protocol can be used to guarantee that adjacent bytes are different. Thus, it is possible to send a block of data to the printer without the use of Strobe. The encoding protocol used in Eight Bit Self-Clocked mode is an adaptation of the PackBits run-length compression protocol. However, other compression protocols can be used to generate nonrepeating, adjacent data bytes without departing from the scope of the present invention.

Under the Modified Packbits protocol, data is encoded into either literal runs or repeated runs. A literal run is a sequence of bytes such that no two adjacent bytes are the same. A repeated run is a sequence of bytes all of which are the same.

Runs can be from 1 to 127 bytes in length. A literal run consists of a length byte with a value of n. To distinguish this as a length byte for a literal run, the high order bit is turned off. The length byte is followed by n bytes of literal data. A repeated run consists of a length byte n. To distinguish this as a length byte of a repeated run, the high order bit of the length byte is turned on. The length byte is followed by a single byte to be repeated n times. In this case, the length bytes are distinguished by the value of the high order byte.

However, any method for distinguishing the length bytes can be used.

If the run length byte is the same as the first data byte in a literal run, the run length is decreased by one, and the final byte of the run is moved to the following run. The run consisting of a single byte with a value of one, encoded as 0×01–0×01, cannot be shorted by one, so this run is encoded as a repeat run 0×81–0×01.

If the run length byte is the same as the data byte in a repeated run, the run length is decreased by one, and the final byte of the run is moved to the following run. The repeat run consisting of one byte of 0×81 (normally encoded as 0×81–0×81) cannot be shortened by one, so this run is encoded as a literal run: 0×01–0–81. If the run length byte is identical to the last data byte of the previous run, then a separator token is inserted into the datastream to separate the two runs. A separator token is some value that is not used to encode runs (e.g., 0×00 nor 0×80).

Figure 11:
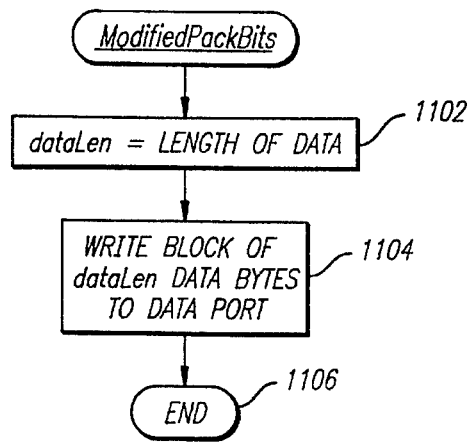
FIG. 11 illustrates a Eight Bit Self-Clocked without Semistrobe process flow.

FIG. 11 illustrates a Eight Bit Self-Clocked process flow. At processing block 1102, dataLen is set to the length of the data. At processing block 1104, the block of dataLen data bytes is transferred to the data port without any handshaking (i.e., without Strobe). Processing ends at block 1106.

Because there are no repeat patterns, the semistrobe is not required. The transfer rate for this mode is about 1/t where t is the time to complete a single I/O instruction. As indicated previously, a block of data can be sent using a block transfer I/O instruction (e.g., rep outsb) thereby increasing the rate at which data can be sent to the printer.

ASYNCHRONOUS PACKET MODE

In Asynchronous Packet mode, the host generates a byte packet (e.g., a string of eight to sixteen bytes). The byte values are arbitrary. There is no need for adjacent bytes to be different. All of the data bytes can be identical. To send a packet, the host computer disables interrupts, issues a synchronizing signal, and then enters a write loop to transfer the data packet to the data port using a technique that insures that the byte-to-byte timing is constant (e.g., on an Intel 80×86 processor, the "rep outsb" instruction).

A synchronizing signal may be issued, for example, by generating a semistrobe, toggling strobe, or prepending a two byte header to a packet such as 0×FF–0×00). No additional strobe signals are necessary to send each data byte.

Figure 19:
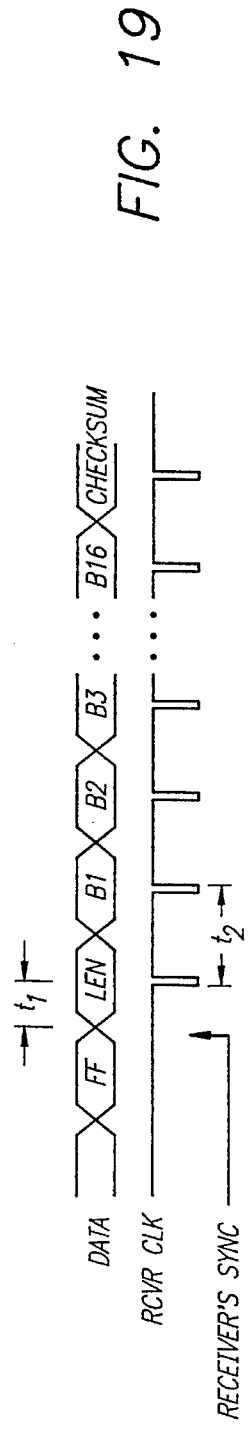
FIG. 19 illustrates a timing diagram for synchronization using the packet header method.

FIG. 19 illustrates a timing diagram for synchronization using the packet header method. The receiver circuitry in the printer waits for the initial synchronizing signal. The printer then waits a specified time t1 until the first byte ('FF') is stable. Preferably, this time should be halfway between the time the first byte is stable on the data bus and the time the data bus begins changing from the first to the second byte. That is, for example, the middle of the LEN "byte cell". The printer then reads the data lines and stores the data value in a buffer. The printer then waits a specified time t2 until the middle of the next byte cell, and stores that byte. This process repeats until the end of the byte packet.

Because host computers operate at different speeds, data from different hosts will arrive at the printer at different speeds. Because of this, a calibration step is performed. As a result of the calibration operation, asynchronous mode can operate reliably with multiple hosts operating at differing speeds.

One example of a calibration method sends one or more calibrating packets of data before a print job. The calibration packet is the same length as the normal data packet and has a recognizable final byte. A calibration packet must be recognizable by a printer so that the calibration packet is not printed. Thus, the calibration packet is initiated with a different synchronizing command (e.g., toggling SelectIn or using a distinguishing header pattern such as 0×F0–0×0F).

Whenever a printer detects a calibration packet, it times the duration from the synchronizing signal to the middle of the first byte (i.e., time t1 from above), and the time from the beginning of the first byte to the end of the last byte (i.e., time t2 divided by the number of bytes in the packet).

When a host disables interrupts, it must also disable any activity that significantly impacts the byte-to-byte timing of the output loop. Small variances can be tolerated. For example, those variances caused by dynamic memory refresh and lower-speed Direct Memory Access (DMA). However, coprocessor or bus master activity can consume substantial portions of the bus bandwidth thereby delaying the transmission of the next byte in the output loop. This latter type of contention must be prevented to avoid impacting the byte-to-byte timing. TThe transmitter and receiver can get out of synchronization. At the transmitter, bus activity causes the data to come out at different rates. At the receiver, there is an error between the precise rate the transmitter sends the data, and the calibrated clock in the printer.

For a packet of n bytes, the maximum byte-to-byte variation caused by the transmitter and receiver is approximately ½ n. This guarantees that no byte cell is sampled by the printer more than ½ a byte-time from the center of the byte cell.

If the synchronizing signal used is a packet header, the packet length can be included in the header. For example, a header 0×FF–0xx, where xx is the packet length in bytes, can be used. This is especially effective for short packets (i.e., one to sixteen bytes) because it provides a clear starting time for a packet as well as a length value. This further eliminates the need to append filler bytes to the end of a fixed-length packet. The additional cost associated with sending a length byte with a variable length packet instead of using a fixed length packet can be evaluated based on the typical data packets being sent.

To increase reliability or error detection, various techniques can be applied to Asynchronous Packet mode. These techniques, in addition to others, can be used by a printer can detect the majority of data transfer errors and reject the transmission (e.g., print job). For example, a checksum byte (e.g., modulo-256 sum of the data bytes or the exclusive-OR of all the data bytes) can be appended to the packet. In addition to or instead of the use of a checksum, a fixed stop byte can be appended to the packet.

Another technique includes an acknowledgment signal, provided by the printer to the host, after each packet is received. For example, an "Ack" can be sent to indicate a successful transfer and a Fault can be sent for an unsuccessful transfer. When a fault is detected, a host can retransmit any corrupted packets to the printer. The use of an acknowlegement signal can be used when a host cannot disable competing bus activities and, therefore, transfer errors may be more prevalent.

Figure 9:
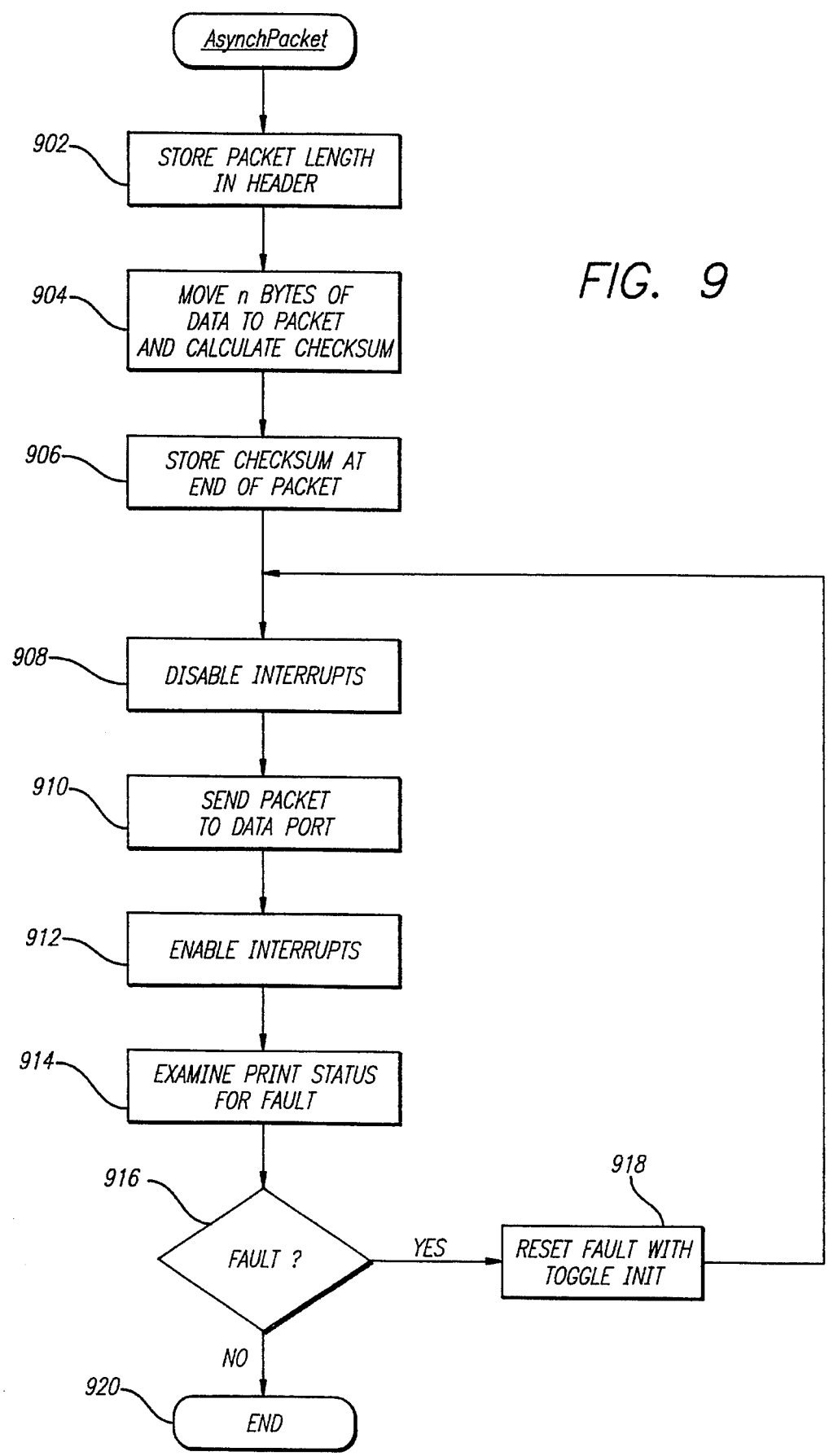
FIG. 9 illustrates a Asynchronous Packet process flow.

FIG. 9 illustrates Asynchronous Packet process flow. At processing block 902, a packet header is built in a packet buffer. In this example, the header consists of a first byte equal to 0×FF and a packet length (e.g., 0×01–0×10) in the second byte. At processing block 904, the packet data is moved from the output buffer to the packet buffer. The checksum value is calculated during the transfer. At block 906, the checksum is stored after the final byte in the packet.

At processing block 908, interrupts are disabled. At block 910, the data is written to the printer data port using a block I/O instruction. At block 912, the interrupts are enabled. The host reads the printer status port at block 914. If, at decision block 916 (i.e., "FAULT?"), the /FAULT line is set high, the packet was successfully transferred, and processing ends at block 920.

If, at decision block 916, FAULT is low, an error occurred in sending the packet. The host resets FAULT by toggling /INIT control line, at processing block 918. Processing continues at block 908 to resend the packet.

Using this example, packet structure consisting of a two byte header, typically sixteen bytes of data, and a one byte checksum, an error-free transmission can be made with only twenty I/O cycles are executed to transfer the packet. That is, nineteen to transfer a full packet and one to read the transfer status. The theoretical maximum transfer rate for this method is $^{16}/_{20}$ t (or $^4/_5$ t), where t is the time to execute a single I/O cycle.

SYNCHRONOUS PACKET MODE

Longer packets of data can be transferred in the Synchronous Packet mode than in the Asynchronous Packet mode. Using this mode, clock-recovery circuitry detects boundaries between characters on the data bus. Packets include a one-byte header containing the length of the data in the packet. To allow reliable clock recovery, data within a frame can be encoded using an encoding protocol that eliminates most or all identical characters.

In asynchronous packet mode, a fixed character recovery clock is generated from a timing signal at the beginning of the packet. Normal variations between the transmission rate and the assumed reception rate causes the clock to desynchronize from the input after reasonably small number of characters.

Longer packets of data can be transferred in the synchronous packet mode than in the asynchronous packet mode, because the receiver resynchronizes the receiving clock between each pair of different characters using the edge detection algorithm described above. After a packet start signal (such as a semi-strobe, a full strobe, or a recognizable header transition such as 0×FF, 0×NN, where NN is the length of the packet from 01 to FE), the transmitter outputs the full packet to the printer data port at a fixed repeatable rate with interrupts disabled. In cases where there are more than some small number "i" of identical bytes in the data stream, the transmitter routine inserts the 1's complement of the repeated data bytes every "i" byte, as long as the repetition continues. This guarantees that there will be a signal transition on at least one of the 8 data lines every "i" characters. That signal transition allows resynchronization, through the edge detector, of the clock that recovers this data.

Like the asynchronous packet receiver, the synchronous packet receiver also needs to be calibrated to know the approximate rate of arrival of input characters. However, the synchronous packet receiver restarts its character to character timing on each stable transition of the input data stream, so input clocking errors do not tend to grow across longer packets. The receiver, of course, needs to automatically delete the inserted 1's compliment byte from the output data stream.

Figure 10:
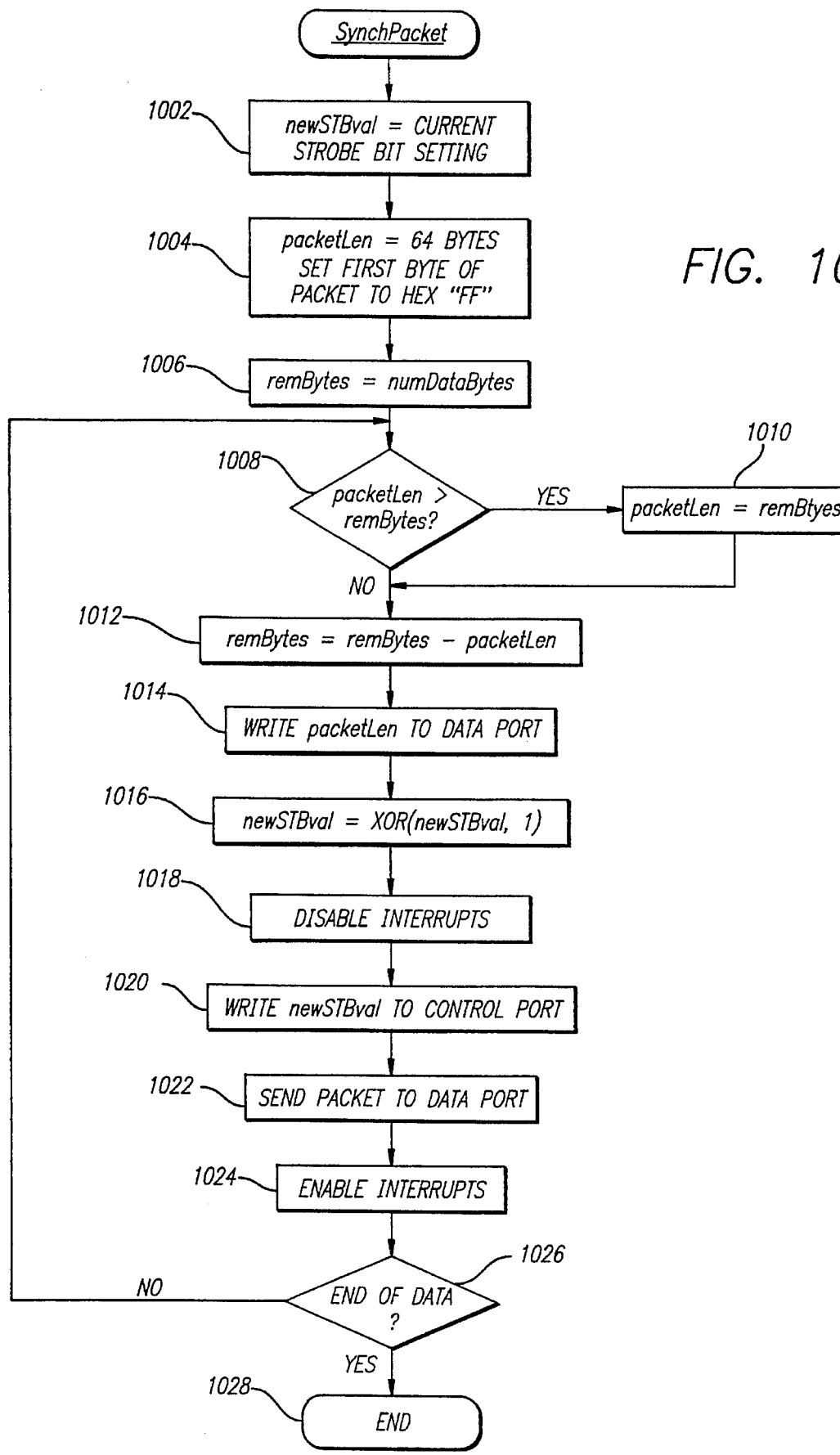
FIG. 10 illustrates a Synchronous Packet process flow.

FIG. 10 illustrates a Synchronous Packet process flow. At processing block 1002, the current Strobe signal value is stored in newSTBval. The packet length, packetLen, is set to 64 bytes. The number of remaining data bytes (i.e., remBytes) is set to the number of data bytes to be transferred (i.e., numDataBytes). At decision block 1008 (i.e., packetLen>remBytes?"), if the packet length is greater than the number of bytes remaining to be transferred, processing continues at block 1010 to set the packet length to the number of remaining data bytes. Processing continues at block 1012. If, at decision block 1008, the number of bytes remaining is greater than or equal to the packet length, processing continues at block 1012.

At processing block 1012, the number of bytes remaining is decreased by the packet length. At processing block 1014, the packet length is written to the data port. At block 1016, newSTBval is determined by performing an "exclusive or" operation on the newSTBval and one operands. At processing block 1018, interrupts are disabled, At block 1020, newSTBval is written to the control port. At block 1022, a packet is written to the data port using a block I/O instruction. At processing block 1024, interrupts are enabled. At decision block 1026 (i.e., "end of data?"), if all of the data bytes have been transferred, processing ends at block 1028. If bytes remain to be transferred, processing continues at decision block 1008 to process the remaining data bytes.

Thus, a method and apparatus for high-speed data transfer between a computer system and a printer has been provided.

We claim:

1. A method of achieving high-speed data transfer using a standard parallel interface between a host computer system and a peripheral device comprising the steps of:

(a) replacing an old value of one bit of a data byte in a data byte sequence with a new value such that said data byte is not equal to an immediately preceding or immediately succeeding data byte;

(b) storing said old value in an encoding byte; repeating steps (a) and (b) for each data byte Ln said data byte sequence; and transmitting said encoding byte and said data byte sequence to said peripheral device.

2. The method of claim 1 wherein said data byte sequence and said encoding byte comprise an encoded byte sequence.

3. The method of claim 2 wherein said encoded byte sequence consists of seven data bytes and one encoding byte.

4. The method of claim 1 wherein said steps (a) and (b) further include the following steps:

(a) storing said data byte in a first byte of a word register;

(b) storing an encoding byte in a second byte of said word register;

(c) executing a shift operation on said word register such that said old value of said data byte is shifted into said second byte and one bit of said alternating binary digit sequence becomes said new value of said data byte; and (d) storing the contents of said first byte in an output buffer.

5. The method of claim 4 wherein said steps (a), (c) and (d) are executed for each data byte in said data byte sequence.

6. The method of claim 4 wherein said second byte is stored in said output buffer.

7. The method of claim 4 wherein said encoding byte is an alternating sequence of binary digits.

8. The method of claim 1 further including the following steps:
   (a) receiving an encoding byte into a shift register;
   (b) storing data bits of said data byte in a memory store;
   (c) executing a shift operation on said shift register such that said old value of said data byte is shifted into said memory store to obtain a decoded data byte; and
   (d) storing said decoded data byte in an input buffer.

9. The method of claim 8 wherein said steps (b) through (d) are executed for each data byte in said data byte sequence.

* * * * *